(12) United States Patent  
Charlesworth et al.

(10) Patent No.: US 7,054,812 B2  
(45) Date of Patent: May 30, 2006

(54) DATABASE ANNOTATION AND RETRIEVAL

(75) Inventors: Jason Peter Andrew Charlesworth, Haslemere (GB); Philip Neil Garner, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 669 days.

(21) Appl. No.: 09/840,886

(22) Filed: Apr. 25, 2001

(65) Prior Publication Data

US 2002/0022960 A1 Feb. 21, 2002

(30) Foreign Application Priority Data

May 16, 2000 (GB) .................................. 0011798

(51) Int. Cl.
*G10L 15/04* (2006.01)
(52) U.S. Cl. ............... 704/251; 704/252; 704/231; 704/239; 704/247
(58) Field of Classification Search ........... 704/235, 704/275, 231, 239, 254–265, 238, 246, 247, 704/251, 252; 382/313
See application file for complete search history.

(56) References Cited

U.S. PATENT DOCUMENTS

| 4,227,176 | A | 10/1980 | Moshier | 340/146.3 |
| 4,736,429 | A | 4/1988 | Niyada | 704/254 |
| 4,903,305 | A | 2/1990 | Gillick et al. | 704/240 |
| 4,975,959 | A | 12/1990 | Benbassat | 704/240 |
| 4,980,918 | A | 12/1990 | Bahl et al. | 381/43 |
| 4,985,924 | A | 1/1991 | Matsuura | 704/239 |
| 5,075,896 | A | 12/1991 | Wilcox et al. | 382/225 |
| 5,131,043 | A | 7/1992 | Fujii et al. | 704/239 |
| 5,136,655 | A | 8/1992 | Bronson | 381/41 |
| 5,202,952 | A | 4/1993 | Gillick et al. | 395/2 |
| 5,333,275 | A | 7/1994 | Wheatley et al. | 704/231 |
| 5,390,278 | A | 2/1995 | Gupta et al. | 379/88.01 |
| 5,500,920 | A | 3/1996 | Kupiec | 395/2.79 |
| 5,577,249 | A | 11/1996 | Califano | 395/611 |
| 5,594,641 | A | 1/1997 | Kaplan et al. | 395/601 |
| 5,638,425 | A | 6/1997 | Meador, III et al. | 379/88 |
| 5,640,487 | A | 6/1997 | Lau et al. | 395/2.52 |
| 5,649,060 | A | 7/1997 | Ellozy et al. | 395/2.87 |
| 5,675,706 | A | 10/1997 | Lee et al. | 395/2.65 |
| 5,680,605 | A | 10/1997 | Torres | 395/603 |
| 5,684,925 | A | 11/1997 | Morin et al. | 704/239 |
| 5,708,759 | A | 1/1998 | Kemeny | 704/211 |

(Continued)

FOREIGN PATENT DOCUMENTS

EP 0 597 798 10/1993

(Continued)

OTHER PUBLICATIONS

Berge, C., "Graphs And Hypergraphs", North Holland Mathematical Library, Amsterdam (1976) p. 175.

(Continued)

*Primary Examiner*—Susan McFadden  
*Assistant Examiner*—Huyen X. Vo  
(74) *Attorney, Agent, or Firm*—Fitzpatrick, Cella, Harper & Scinto

(57) ABSTRACT

A system is provided for determining a sequence of sub-word units representative of at least two words output by a word recognition unit in response to an input word to be recognized. In a preferred embodiment, the word alternatives output by the recognition unit are converted into sequences of phonemes. An optimum alignment between these sequences is then determined using a dynamic programming alignment technique. The sequence of phonemes representative of the input sequences is then determined using this optimum alignment.

61 Claims, 21 Drawing Sheets

U.S. PATENT DOCUMENTS

| | | | | |
|---|---|---|---|---|
| 5,721,939 | A | 2/1998 | Kaplan | 395/759 |
| 5,729,741 | A | 3/1998 | Liaguno et al. | 395/615 |
| 5,737,489 | A | 4/1998 | Chou et al. | 395/2.65 |
| 5,737,723 | A | 4/1998 | Riley et al. | 704/243 |
| 5,752,227 | A | 5/1998 | Lyberg | 704/231 |
| 5,781,884 | A | 7/1998 | Pereira et al. | 704/260 |
| 5,787,414 | A | 7/1998 | Miike et al. | 707/2 |
| 5,799,267 | A | 8/1998 | Siegel | 704/1 |
| 5,835,667 | A | 11/1998 | Wactlar et al. | 386/96 |
| 5,852,822 | A | 12/1998 | Srinivasan et al. | 707/4 |
| 5,870,740 | A | 2/1999 | Rose et al. | 707/5 |
| 5,873,061 | A | 2/1999 | Hab-Umbach et al. | 704/251 |
| 5,907,821 | A | 5/1999 | Kaji et al. | 704/4 |
| 5,983,177 | A | 11/1999 | Wu et al. | 704/243 |
| 5,999,902 | A | 12/1999 | Scahill et al. | 704/240 |
| 6,006,182 | A * | 12/1999 | Fakhr et al. | 704/231 |
| 6,023,536 | A | 2/2000 | Visser et al. | 382/310 |
| 6,026,398 | A | 2/2000 | Brown et al. | 707/5 |
| 6,061,679 | A | 5/2000 | Bournas et al. | 707/3 |
| 6,070,140 | A * | 5/2000 | Tran | 704/275 |
| 6,073,099 | A * | 6/2000 | Sabourin et al. | 704/256 |
| 6,122,613 | A * | 9/2000 | Baker | 704/235 |
| 6,172,675 | B1 | 1/2001 | Ahmad et al. | 345/328 |
| 6,178,401 | B1* | 1/2001 | Franz et al. | 704/255 |
| 6,182,039 | B1 | 1/2001 | Rigazio et al. | 704/239 |
| 6,192,337 | B1 | 2/2001 | Ittycheriah et al. | 704/231 |
| 6,236,964 | B1 | 5/2001 | Tamura et al. | 704/254 |
| 6,243,680 | B1 | 6/2001 | Gupta et al. | 704/258 |
| 6,272,242 | B1 | 8/2001 | Saitoh et al. | 382/187 |
| 6,289,140 | B1* | 9/2001 | Oliver | 382/313 |
| 6,314,400 | B1 | 11/2001 | Klakow | 704/257 |
| 6,321,226 | B1 | 11/2001 | Garber et al. | 707/10 |
| 6,389,395 | B1 | 5/2002 | Ringland | 704/242 |
| 6,463,413 | B1* | 10/2002 | Applebaum et al. | 704/256 |
| 6,487,532 | B1 | 11/2002 | Schoofs et al. | 704/251 |
| 6,490,563 | B1 | 12/2002 | Hon et al. | 704/260 |
| 6,535,850 | B1 | 3/2003 | Bayya | 704/239 |
| 6,567,778 | B1 | 5/2003 | Chao Chang et al. | 704/257 |
| 6,567,816 | B1 | 5/2003 | Desai et al. | 707/102 |
| 6,662,180 | B1 | 12/2003 | Aref et al. | 707/6 |
| 2002/0052740 | A1 | 5/2002 | Charlesworth et al. | 704/220 |

FOREIGN PATENT DOCUMENTS

| | | |
|---|---|---|
| EP | 0 649 144 | 7/1994 |
| EP | 0 689 153 | 5/1995 |
| EP | 789349 | 8/1997 |
| EP | 849723 | 6/1998 |
| GB | 2 302 199 | 1/1997 |
| GB | 2 331 816 | 6/1999 |
| GB | 2349260 | 10/2000 |
| GB | 2 355 835 | 5/2001 |
| GB | 2 355 836 | 5/2001 |
| GB | 2 355 837 | 5/2001 |
| WO | WO 98/47084 | 10/1998 |
| WO | WO 99/05681 | 4/1999 |
| WO | 00/31723 | 6/2000 |
| WO | WO 00/54168 | 9/2000 |
| WO | WO 01/31627 | 5/2001 |
| WO | WO 02/27546 | 4/2002 |

OTHER PUBLICATIONS

Gelin, P. & Wellekens, C. J., "Keyword Spotting For Video Soundtrack Indexing", *1996 IEEE Int. Conf. on Acoustics, Speech, and Sig. Proc.*, ICASSP-96, Conference Proceedings (May 7-10, 1996), vol. 1, pp. 299-302.

James, D.A. & Young, S. J., "A Fast Lattice-Based Approach To Vocabulary Independent Wordspotting", 1994 *IEEE Int. Conf. on Acoustics, Speech and Sig. Proc.*, ICASSP-94, vol. i (Adelaide, Australia, Apr. 19-22, 1994), pp. I-377-380.

Rabiner & Juang, "Fundamentals Of Speech Recognition" (1993), pp. 42-50.

Sankoff, D., et al, "Time Warps, String Edits, And Macromolecules: The Theory And Practice Of Sequence Comparison", Bell Laboratories and David Sankoff (1983), Ch. One, pp. 1-44; Part Three, pp. 211-214; Ch. Eleven, pp. 311-318, Ch. Sixteen, pp. 359-362.

Okawa, S. et al., "Automatic Training of Phoneme Dictionary Based on Mutual Information Criterion", *IEEE* (1994), pp. 241-244.

Rahim, M. et al., "A Neural Tree Network for Phoneme Classification With Experiments on the Timit Database", *IEEE* (1992), pp. II-345-II-348.

Sankoff, D., et al, "Time Warps, String Edits, And Macromolecules: The Theory And Practice Of Sequence Comparison", Bell Laboratories and David Sankoff (1983), Ch. One, pp. 1-44; Part Three, pp. 211-214; Ch. Eleven, pp. 311-321, Ch. Sixteen, pp. 359-362.

Wang, H., "Retrieval of Mandarin Spoken Documents Based on Syllable Lattice Matching", *Pattern Recognition Letters* (Jun. 2000), 21, pp. 615-624.

Gerber, C., "A General Approach to Speech Recognition", *Proceedings of the Final Workshop on Multimedia Information Retrieval (Miro '95)*, Glasgow, Scotland (Sep. 18-20, 1995) pp. 1-12.

F. Schiel et al., "The Partitur Format at BAS", In Proc. of the First Int'l. Conference on Language Resources and Evaluation, Granada, Spain, 1998. Complete dates.

Jokinen et al., "A Comparison of Approximate String Matching Algorithms," Software-Practice and Experience, 1996, vol. 26, No. 12, pp. 1439-1458.

Kobayashi et al., "Matching Algorithms Between a Phonetic Lattice and Two Types of Templates—Lattice and Graph," IEEE, 1985, pp. 1597-1600.

Lee, Kai-Fu, "Automatic Speech Recognition," The Development of the SPHINX System, Kiuwer Academic Publishers, pp. 28-29 (1989).

Markowitz, "Using Speech Recognition," Prentice Hall, 1996, p. 221.

Micca, G. et al., "Three Dimensional DP for Phonetic Lttice Matching," Elsevier Science Publishers, 1987, pp. 547-551.

Ng, Kenny, "Survey of Approaches to Information Retrieval of Speech Messages," Feb. 16, 1996, pp. 1-34.

Ng, Kenny, "Subword Unit Representations for Spoken Document Retrieval," Eurospeech, 1997, Completed dates not found.

Ng, Kenny, "Phonetic Recognition for Spoken Document Retrieval," ICASSP, 1998.

Srinivasan et al., "Phonetic confusion matrix based spoken document retrieval," Proceedings of the 23rd Annual International ACM SIGIR Conference on Research and Development in Information Retrieval, Jul. 24-28, 2000, pp. 81-87.

Wechsler et al., "Spoken Document Retrieval Based on Phoneme Recognition," 1998, pp. 1-121.

Witbrock & Hauptmann, A.G., "Using Words and Phonetic Strings for Efficient Information Retrieval from Imperfectly Transcribed Spoken Documents," Proceedings of the 1997 2nd International Conference on Digital Libraries, Jul. 1997, pp. 30-35.

Wold et al., "Content-Based Classificiation, Search, and Retrieval of Audio," IEEE Multimedia, vol. 3, No. 3, 1996, pp. 27-36.

Wright, J. et al., "Statistical Models for Topic Identification Using Phoneme Substrings," IEEE, 1996, pp. 307-310.

"Maximum Entropy and Bayesian Methods," Cambridge, England, 1988, Proceedings of the Eighth Maximum Entropy Workshop, John Skilling (editor), published by Kluwer Academic Publishers, pp. 45-52.

Schmid, Phillip et al., "Automatically Generated Word Pronunciations from Phoneme Classifier Output," Statistical Signal and Array Processing, Minneapolis, Apr. 27-30, 1993, ICASSP, vol. 4, pp. 223-226.

"Template Averaging for Adapting a Dynamic Time Warping Speech Recognizer," IBM Technical Disclosure Bulletin, vol. 32, No. 11, Apr. 1, 1990, pp. 422-426.

Jain, N. et al., "Creating speaker-specific phonetic templates with a speaker-independent phonetic recognizer: implications for voice dialing," 1996 IEEE International Conference on Acoustics, Speech, and Signal Processing Conference Proceedings, 1996, vol. 2, pp. 881-884.

Zobel, J. et al., "Phonetic String Matching: Lessons from Information Retrieval," Sigir Forum, Association for Computing Machinery, 1996, pp. 166-172.

European Search Report for UK Application GBA 9925561.

Cassidy, S. & Harrington, J., "EMU: an Enhanced Hierarchical Speech Data Management System," Proc. Of the 6th Australian Speech Science and Technology Conference, 1996, pp. 381-386.

Foote, J., "Unconstrained Keyword Spotting Using Phone Lattices With Application To Spoken Document Retrieval," Computer Speech and Language, 11, 1997, pp. 207-224, no date.

Gagnoulet et al., "Mairievox: A voice-activated information system," Speech Communication, vol. 10, No. 1, 1991, pp. 23-31.

Haeb-Umbach et al., "Automatic Transcription of Unknown Words in a Speech Recognition System," IEEE, vol. 1, 1995, pp. 840-843.

Bahl et al., "A Method for the construction of acoustic Markov models for words," Oct. 1993, IEEE Transactions on Speech and Audio Processing, vol. 1, Issue 4, pp. 443-452.

Besling, S. et al. "A Statistical Approach To Multilingual Phonetic Transcription," Philips Journal of Research, vol. 49, No. 4, 1995, pp. 367-379, no complete date found.

Bird, Steven et al., "A Formal Framework for Linguistic Annotation," Mar. 1999.

Bird, Steven et al., "Towards A Formal Framework for Linguistic Annotations," Dec. 1998.

* cited by examiner

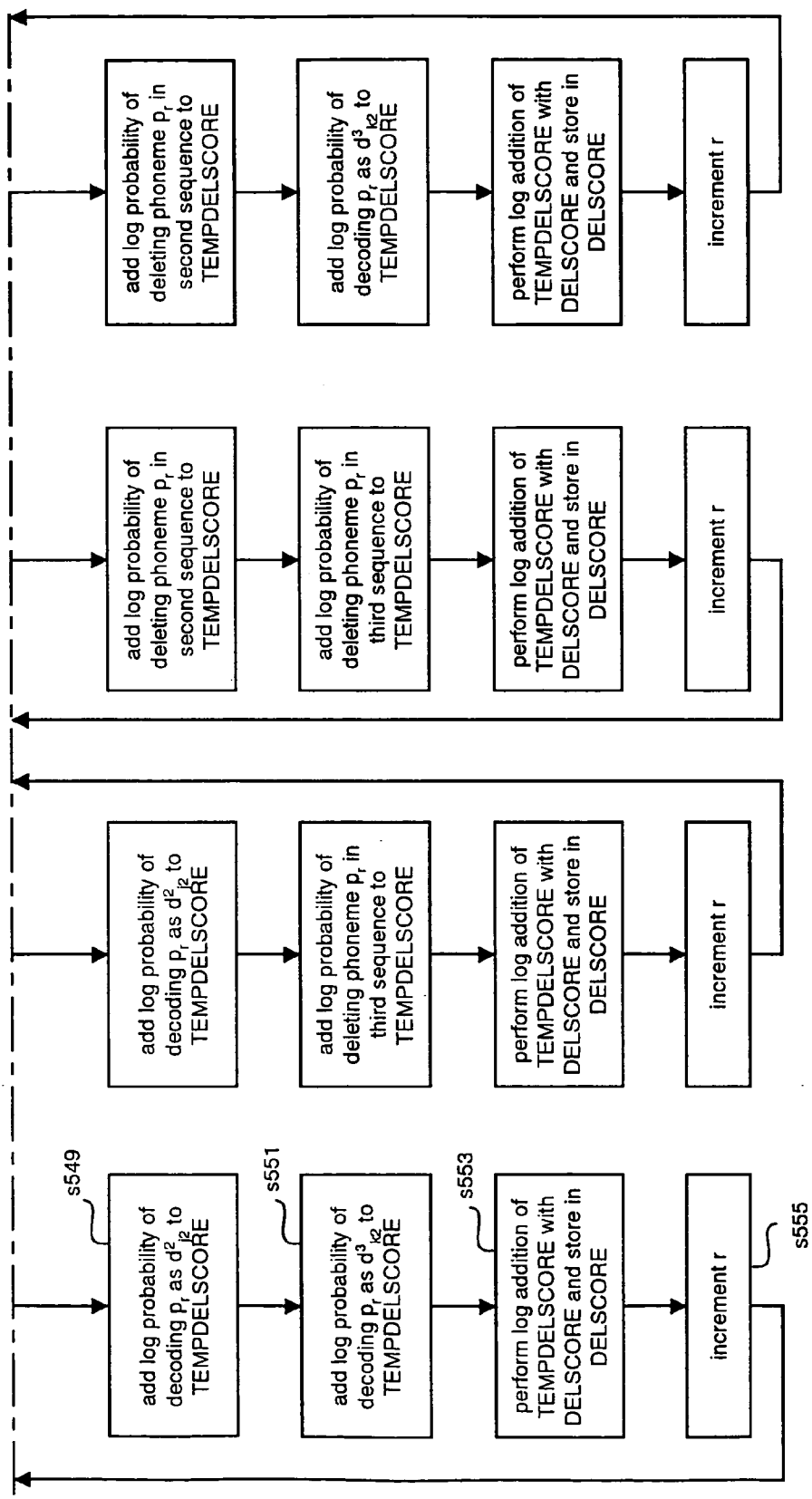

DATABASE ANNOTATION AND RETRIEVAL

The present invention relates to the generation of annotation data for annotating data files which are to be stored in a database for facilitating their subsequent retrieval. The annotation data preferably includes both phoneme data and word data so that the retrieval can be made by a spoken or typed input query.

Databases of information are well known and suffer from the problem of how to locate and retrieve the desired information from the database quickly and efficiently. Existing database search tools allow the user to search the database using typed key words. Whilst this is quick and efficient, this type of searching is not suitable for various kinds of databases, such as video or audio databases which include audio signals but no text. This type of searching is also not suitable when the user's input query is a spoken query since recognition errors are likely to cause errors in the search results.

A recent proposal has been made to annotate video and audio databases with a phonetic transcription of the speech content in the audio and video files, with subsequent retrieval being achieved by comparing a phonetic transcription of a user's input query with the phoneme annotation data in the database. Although the phonetic transcription can be performed manually, it is preferably generated by passing the audio signal in the data file through an automatic speech recognition unit which generates both phonemes and words. However, a problem arises if the speech recognition system does not output phonemes but only outputs words. In this case, a phoneme dictionary could be used to identify the phonemes in the words output by the speech recognition system. However, since the speech recognition system is likely to output a number of alternative words, using a word-to-phoneme dictionary to convert each word into one or more sequences of phonemes (in order to account for different pronunciations of each word) would result in a large amount of phoneme data being stored, which requires more memory and would slow down the subsequent retrieval of data files using the phoneme data.

One aim of the present invention is to provide an alternative system for generating phoneme annotation data which corresponds to word annotation data.

According to one aspect, the present invention provides an apparatus for determining a sequence of sub-word units representative of at least two words output by a word recognition unit in response to a common input word to be recognised, the apparatus comprising: means for receiving a first sequence of sub-word units representative of a first one of said at least two words and for receiving a second sequence of sub-word units representative of a second one of at least two words; means for aligning and comparing sub-word units of the first sequence with sub-word units of the second sequence to form a number of aligned pairs of sub-word units; and means for determining a sequence of sub-word units representative of the received words in dependence upon the aligned pairs of sub-word units.

The present invention also provides a method of determining a sequence of sub-word units representative of at least two words output by a word recognition unit in response to a common input word to be recognised, the method comprising the steps of: receiving a first sequence of sub-word units representative of a first one of at least two words; receiving a second sequence of sub-word units representative of a second one of said at least two words; aligning and comparing sub-word units of the first sequence with sub-word units of the second sequence to form a number of aligned pairs of sub-word units; and determining a sequence of sub-word units representative of the received words in dependence upon the aligned pairs of sub-word units.

Exemplary embodiments of the present invention will now be described in more detail with reference to the accompanying drawings in which.

Figure 1:
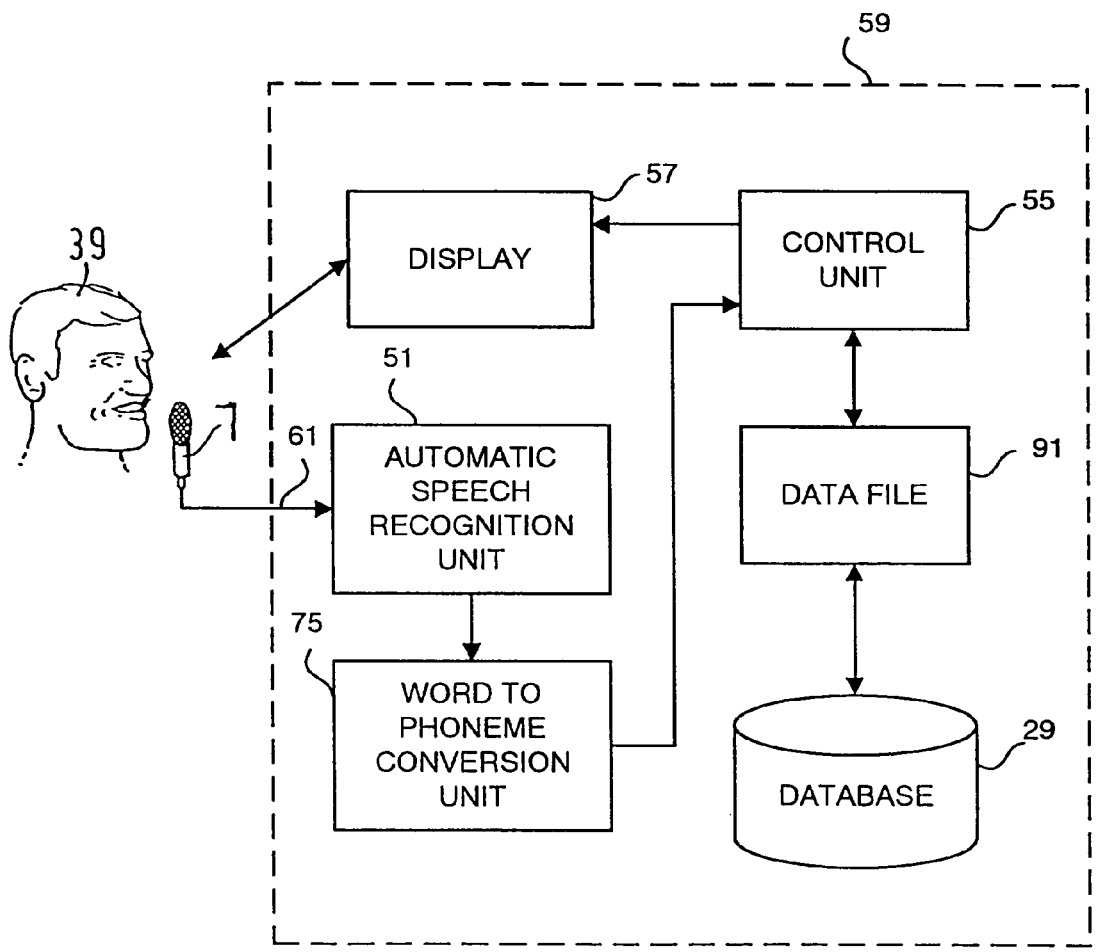
FIG. 1 is a schematic block diagram illustrating a user terminal which allows the annotation of a data file with annotation data generated from a spoken input from a user.
Figure 7:
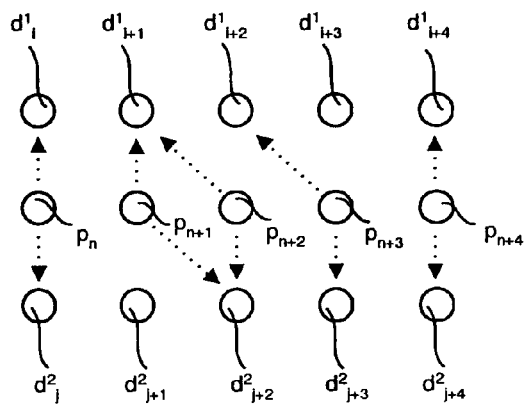
Figure 8:
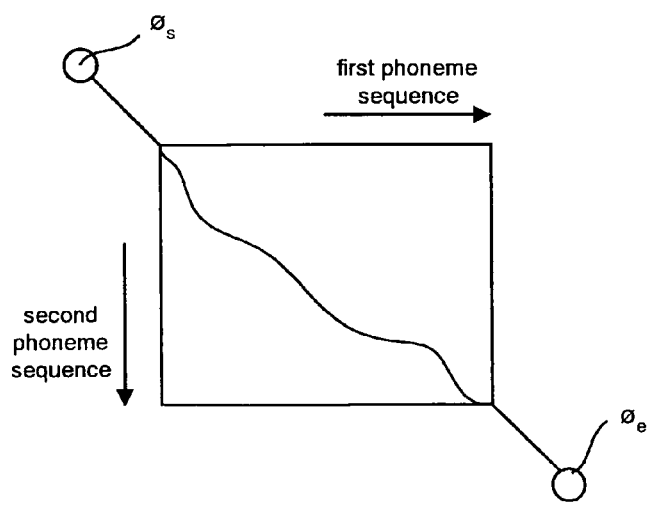
Figure 9:
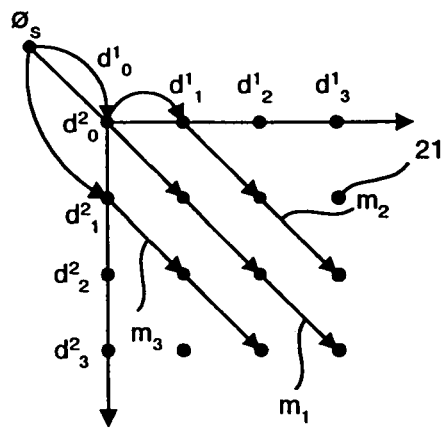
Figure 10:
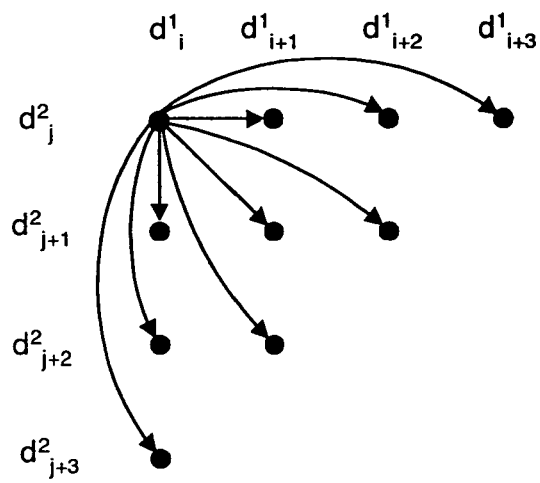
Figure 11:
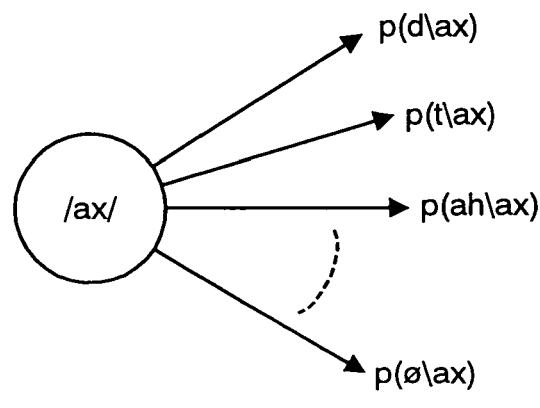
Figure 12:
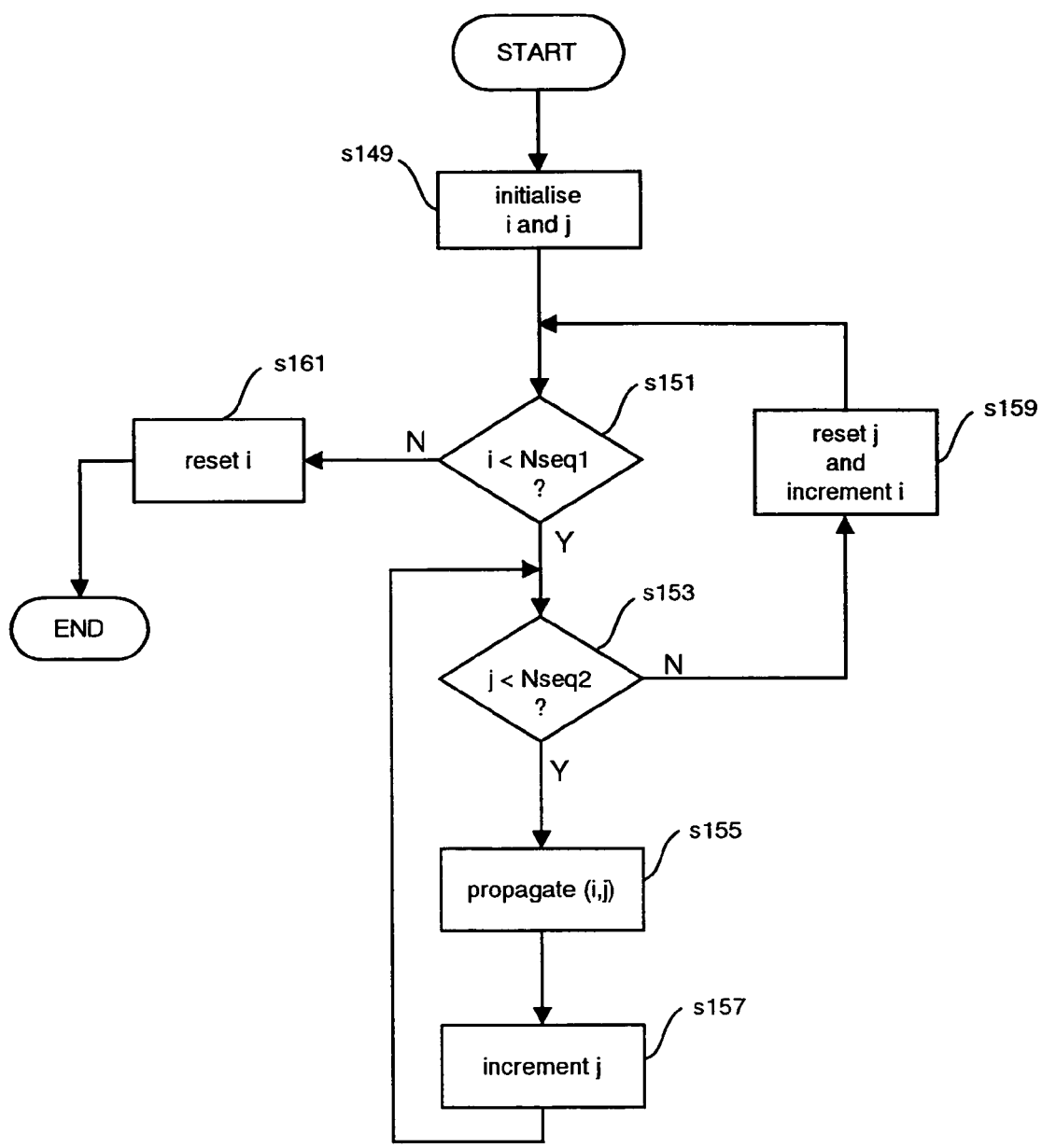
Figure 13:
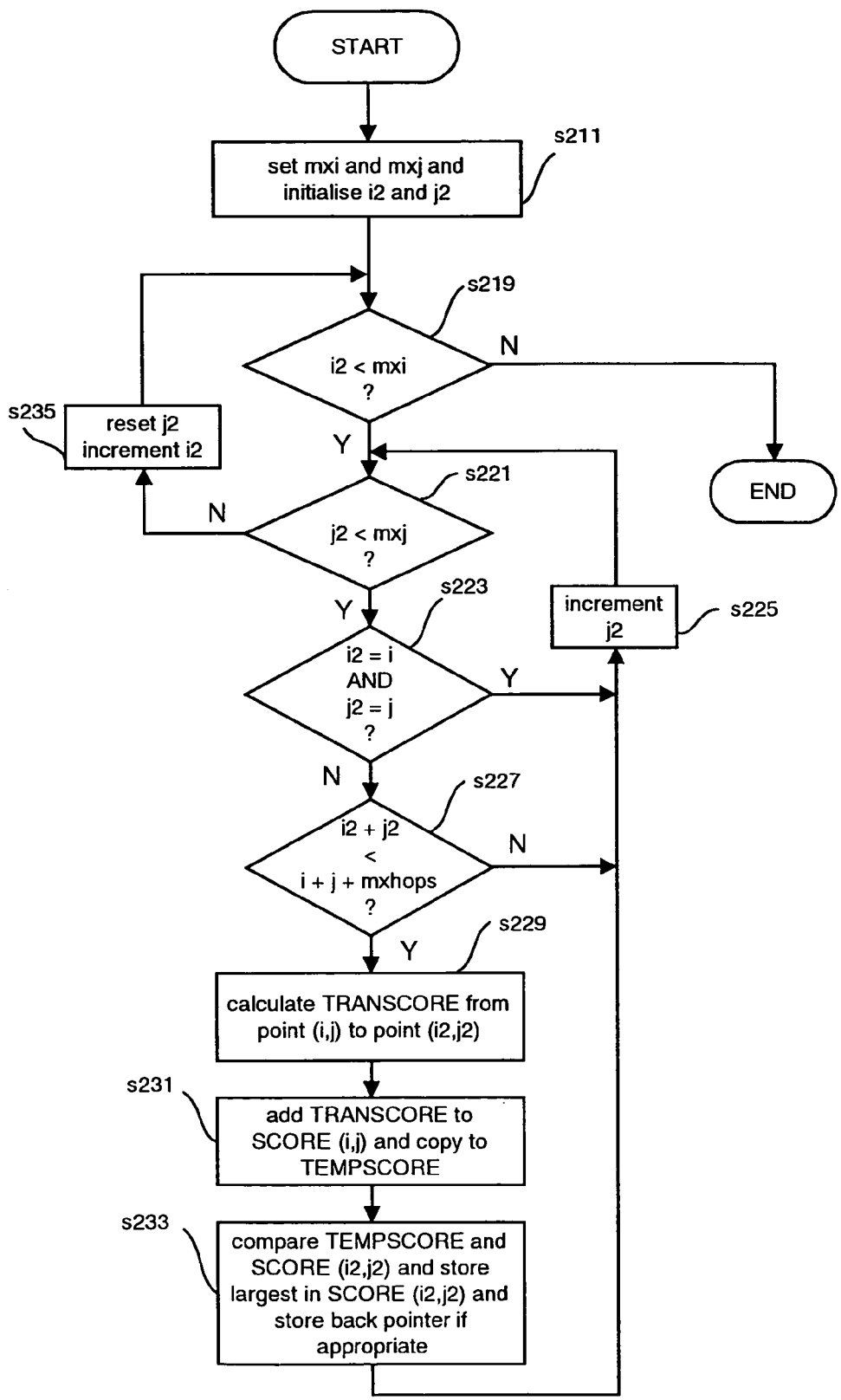
Figure 14:
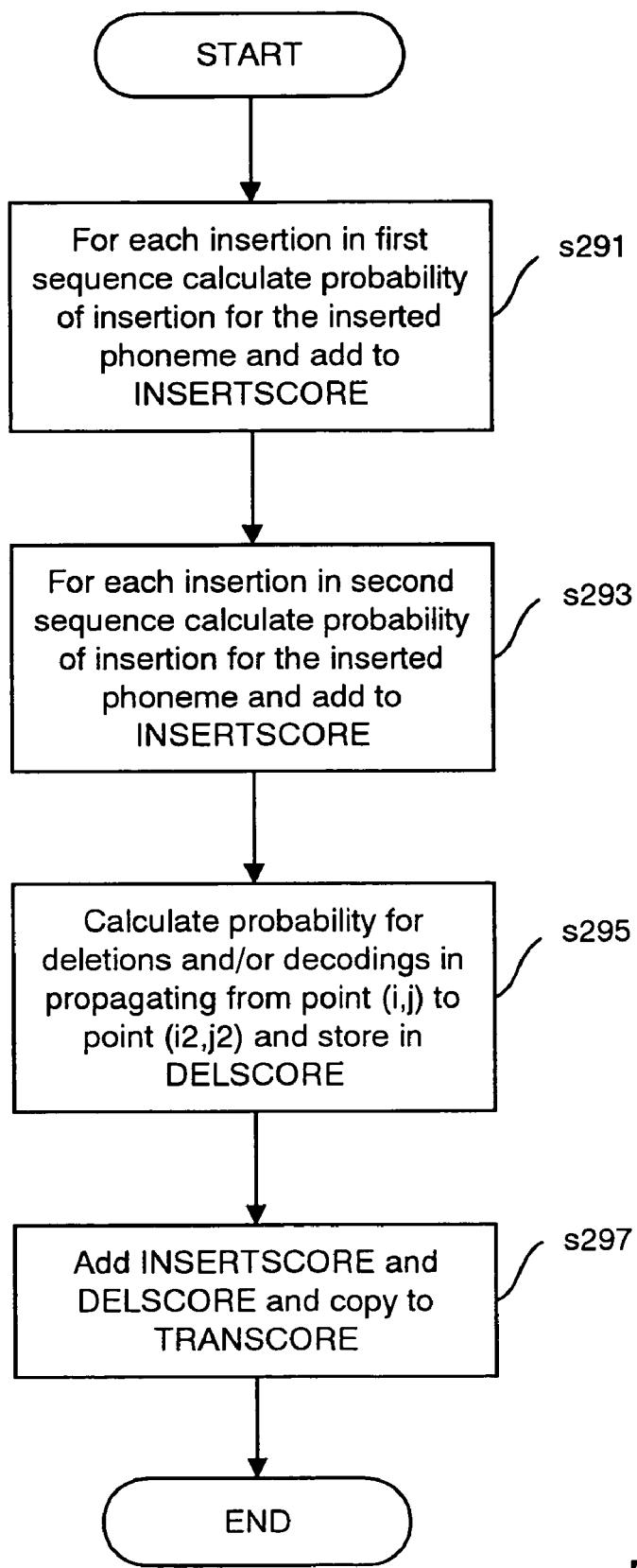
Figure 15:
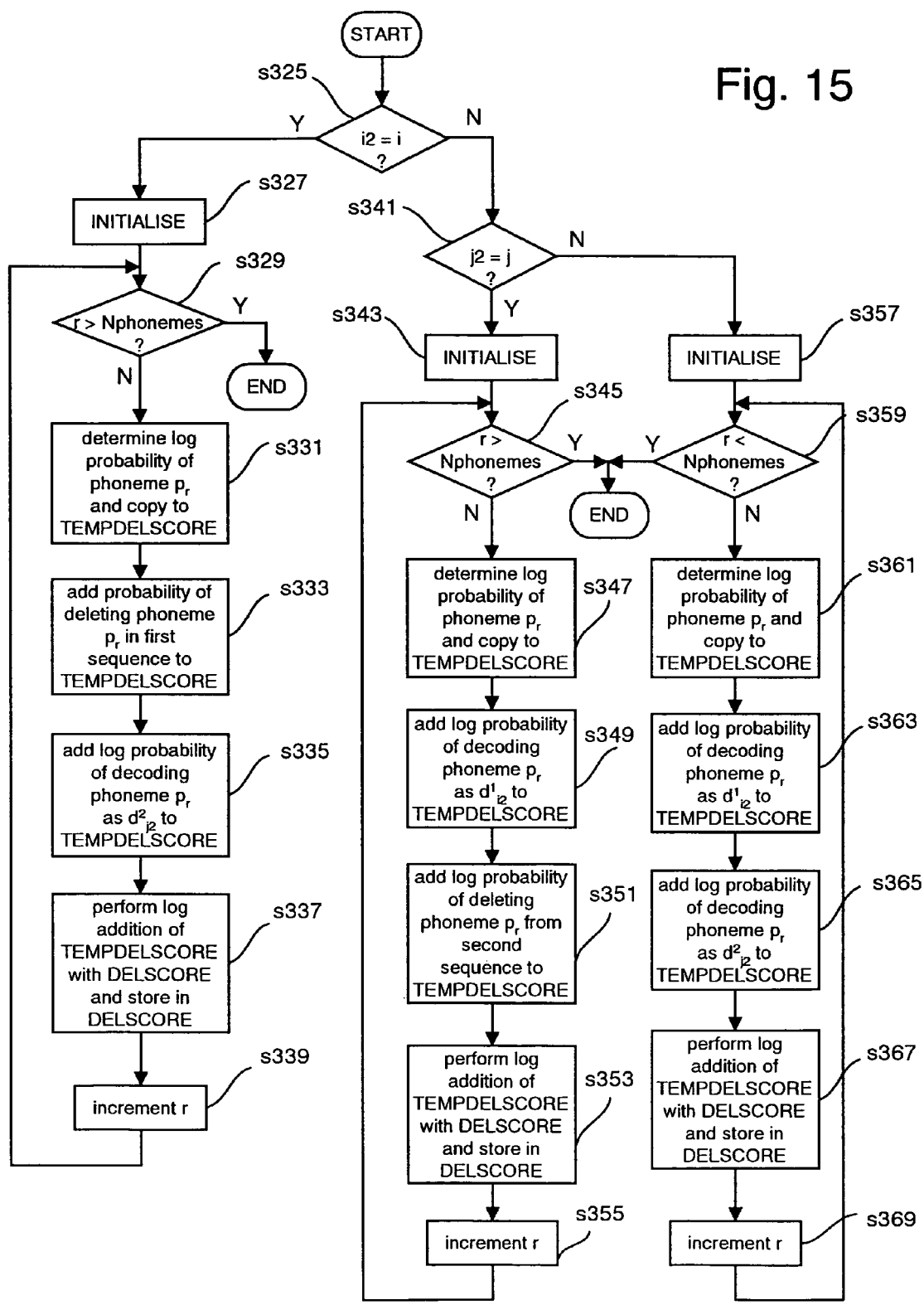
Figure 16A:
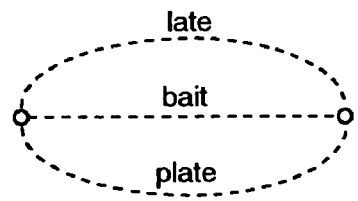
Figure 16B:
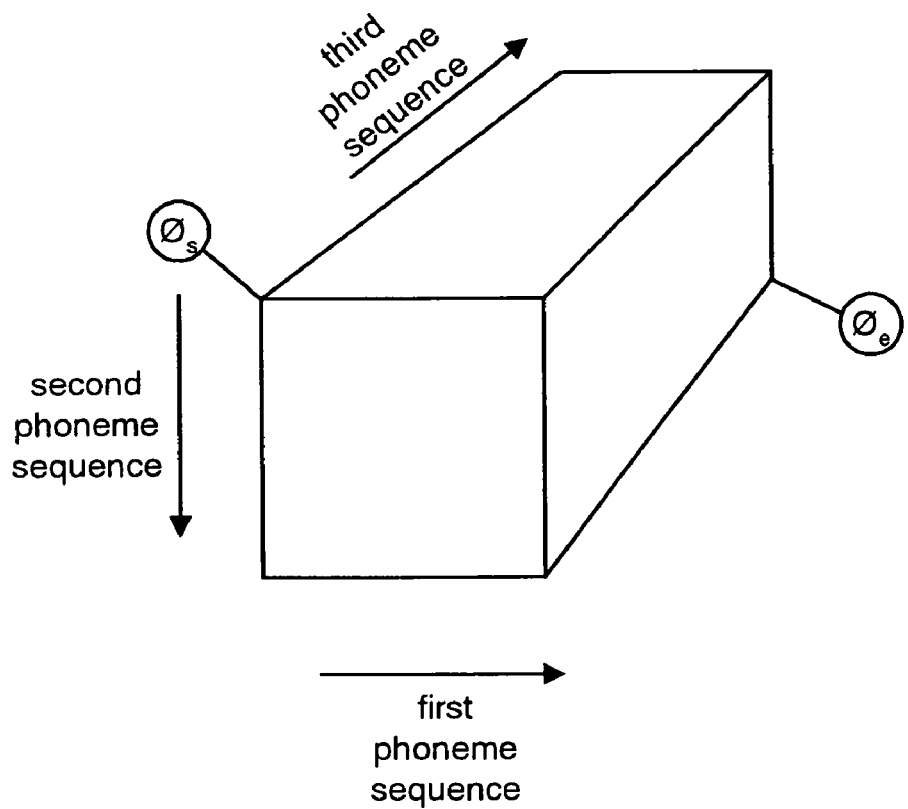
Figure 17:
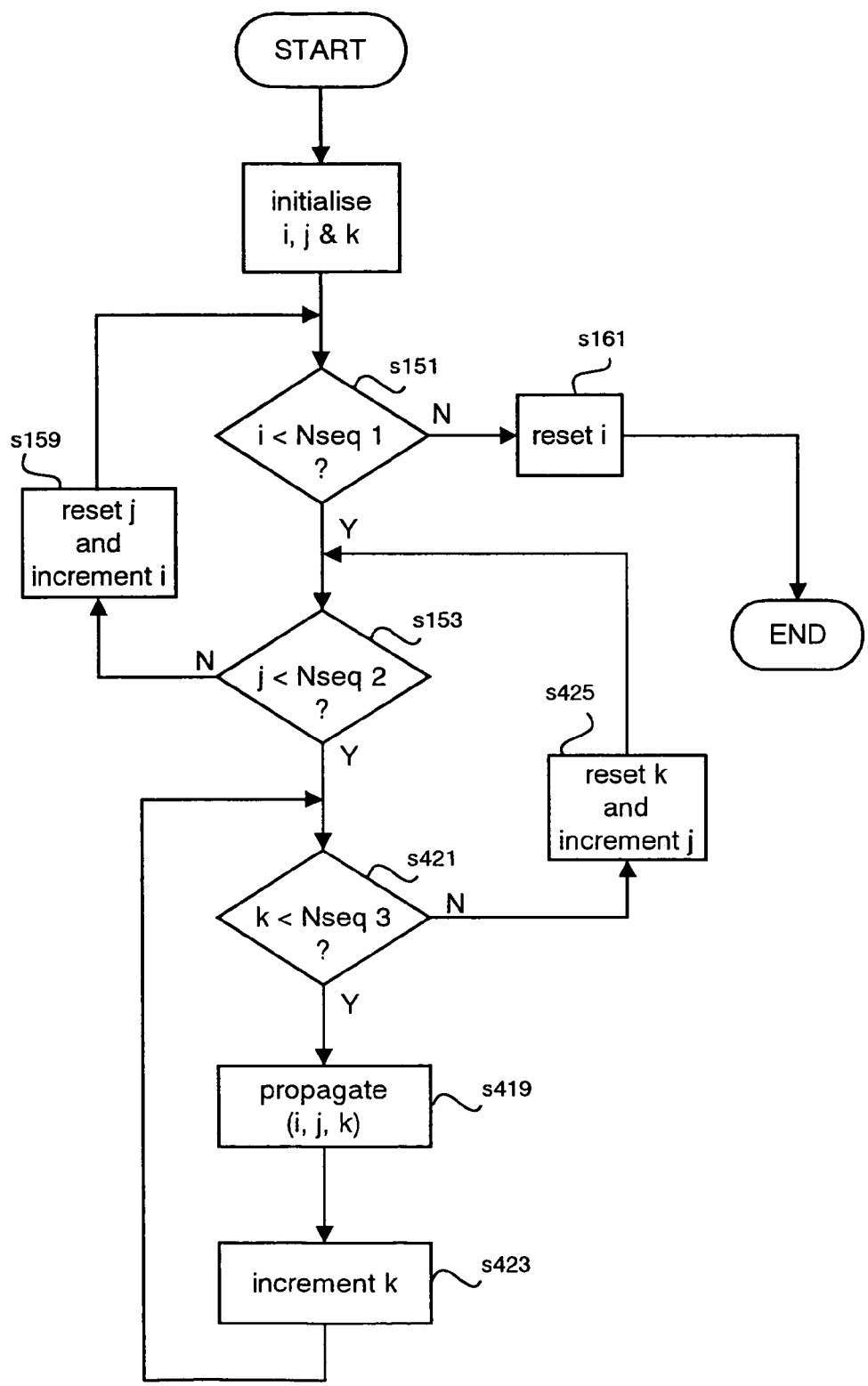
Figure 18:
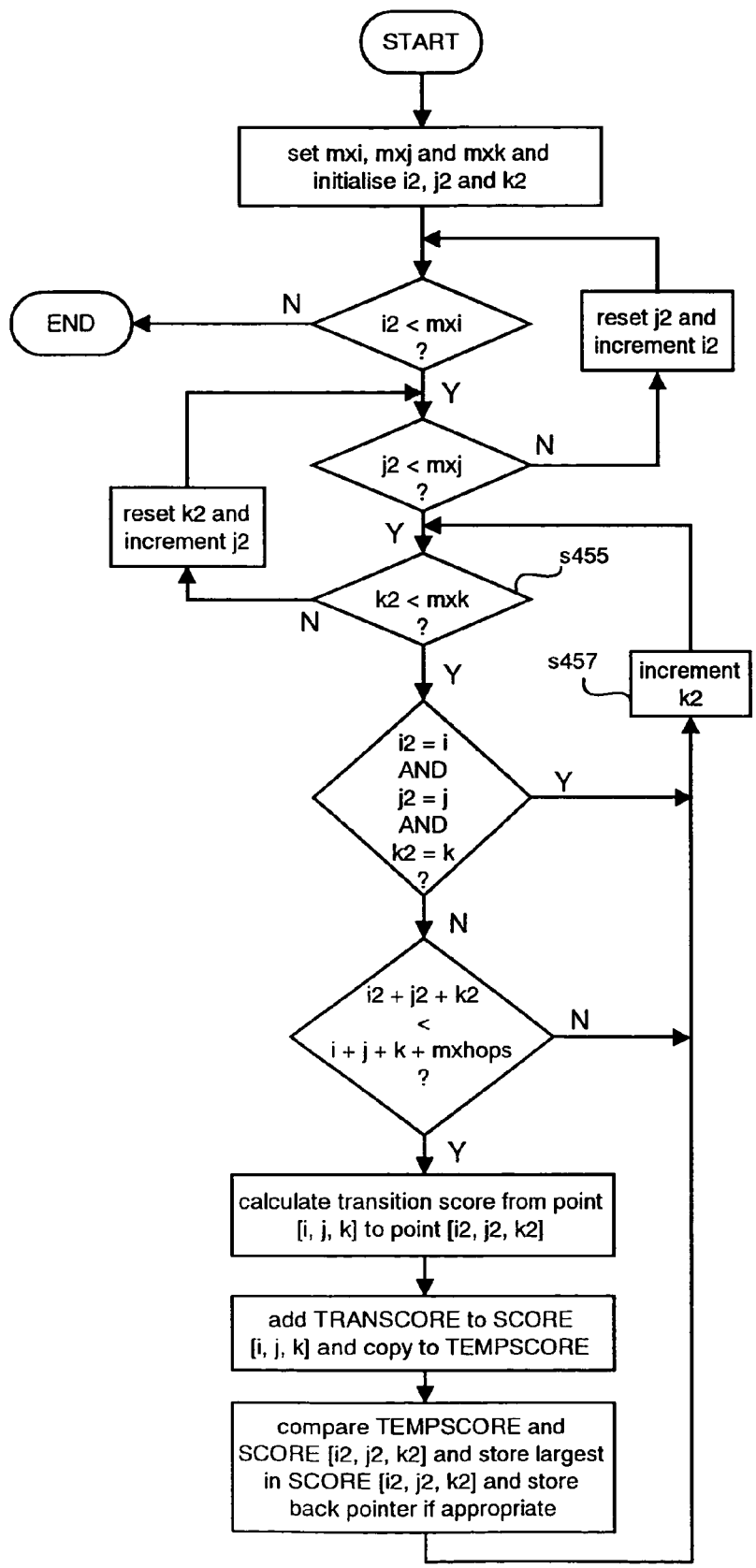
Figure 19:
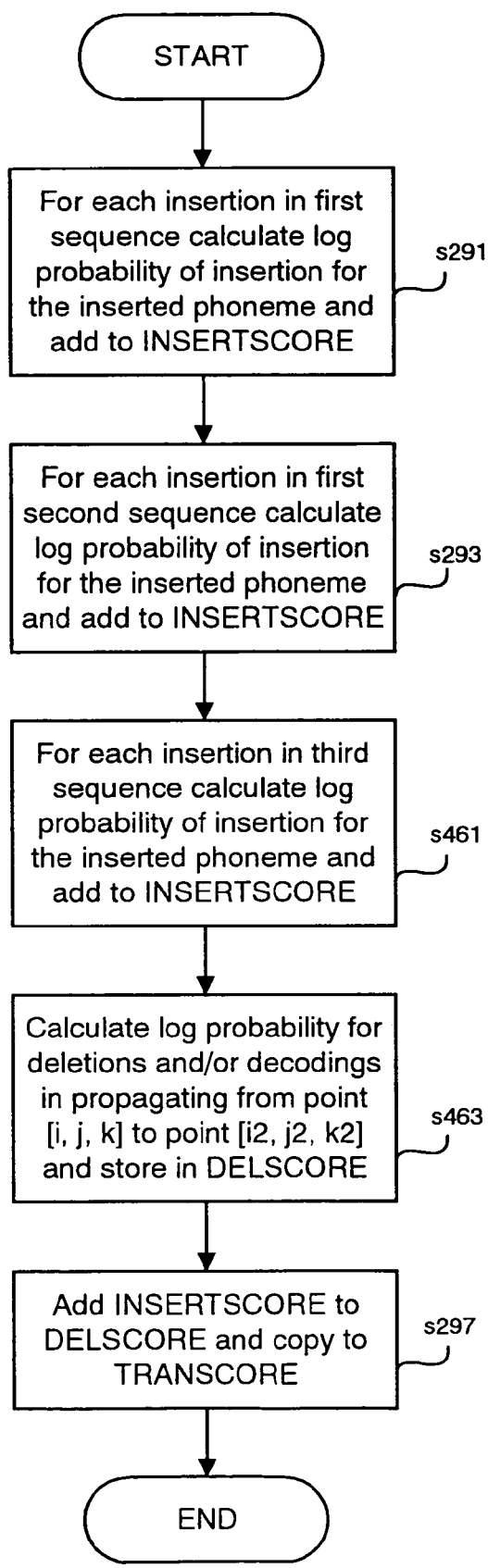
Figure 20A:
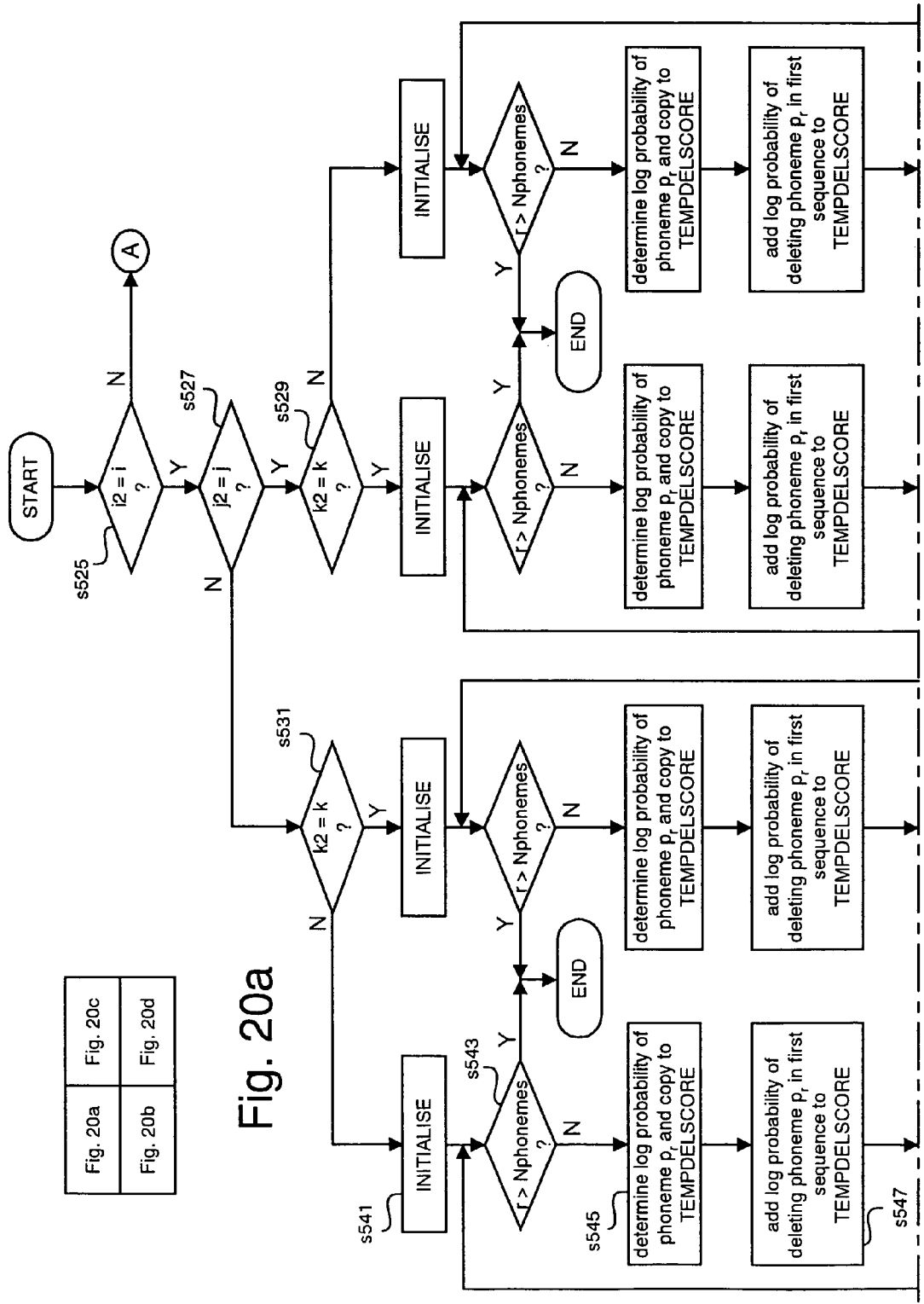
Figure 20C:
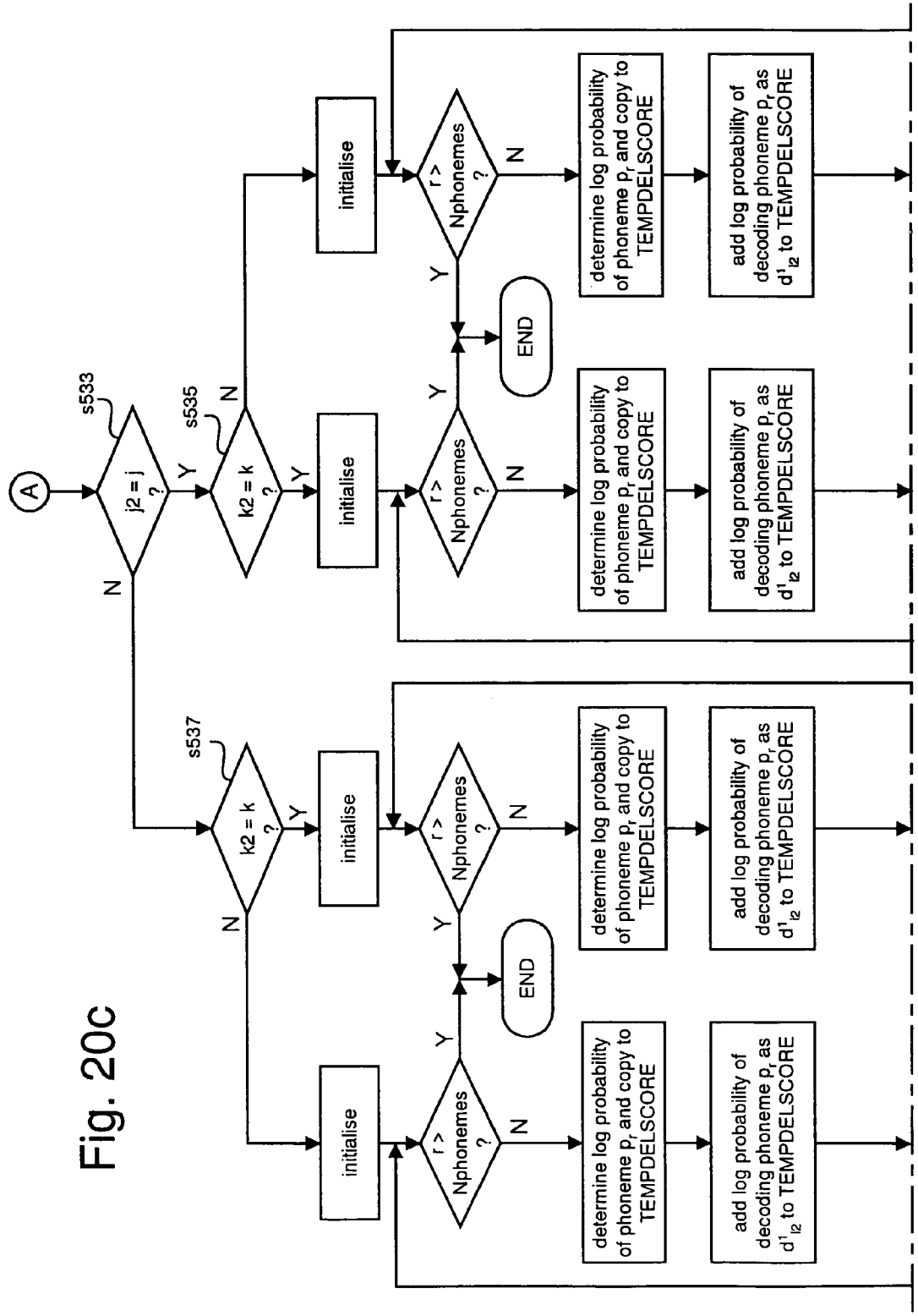
Figure 20D:
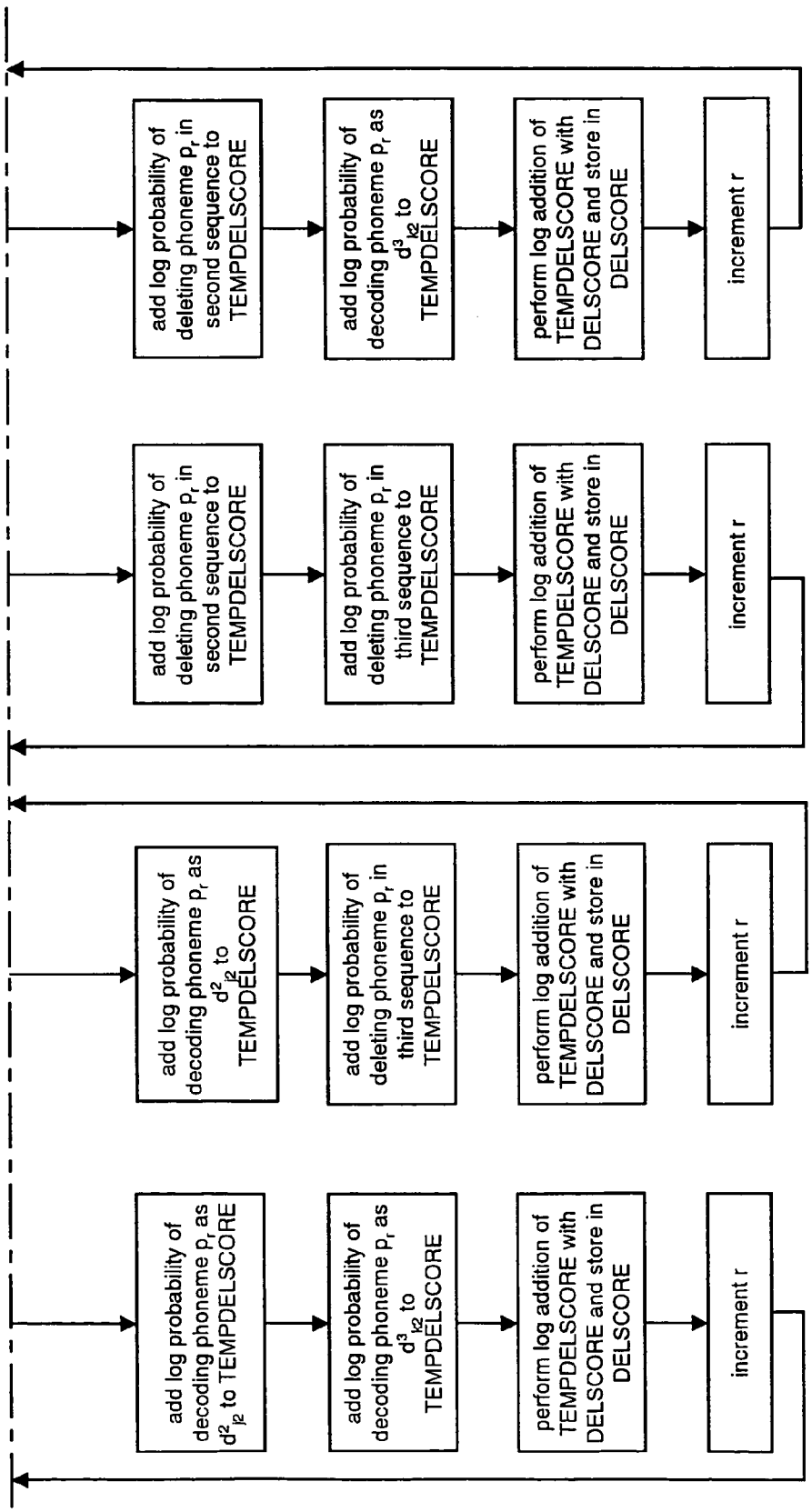
Figure 21:
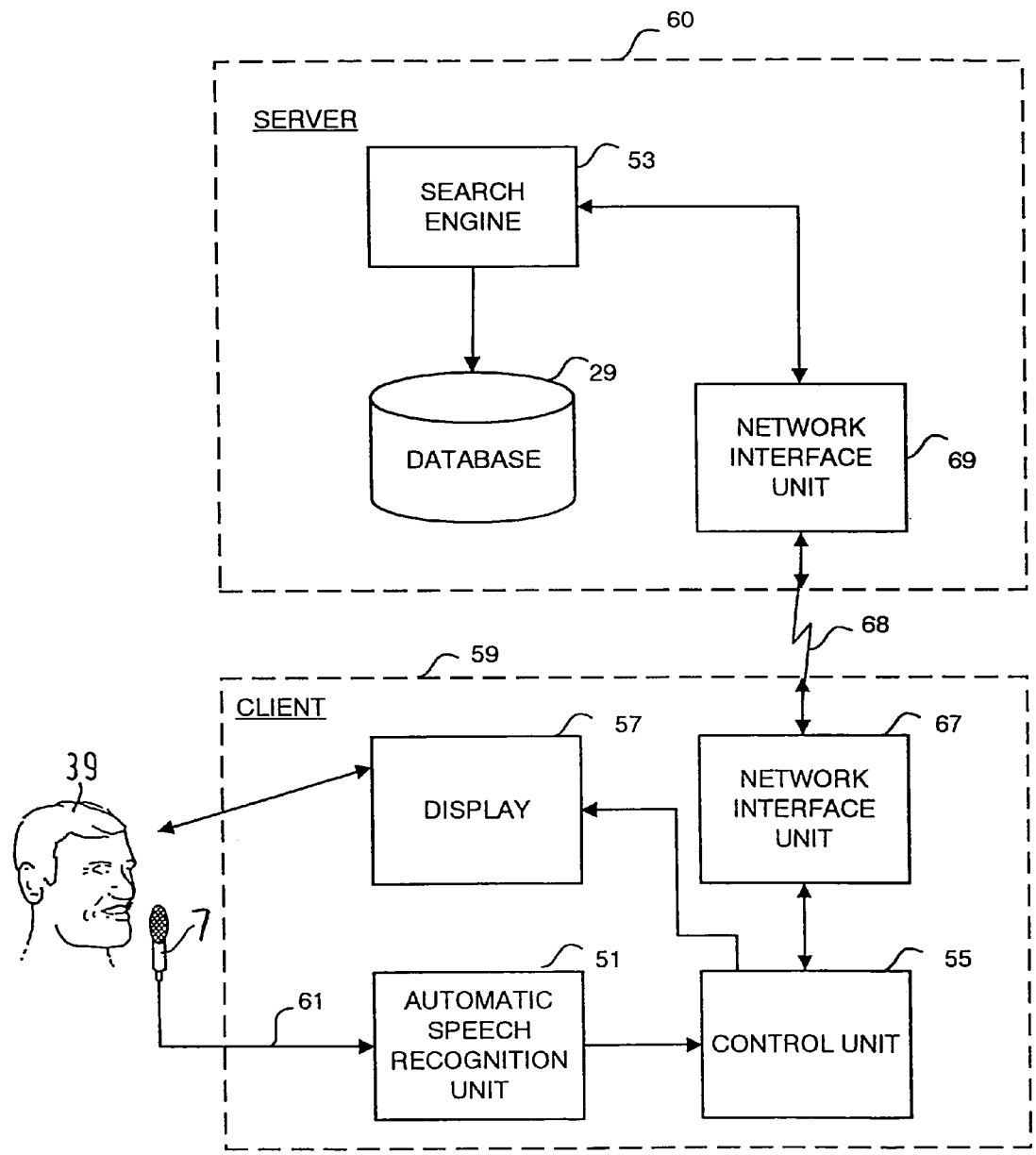
Figure 22:
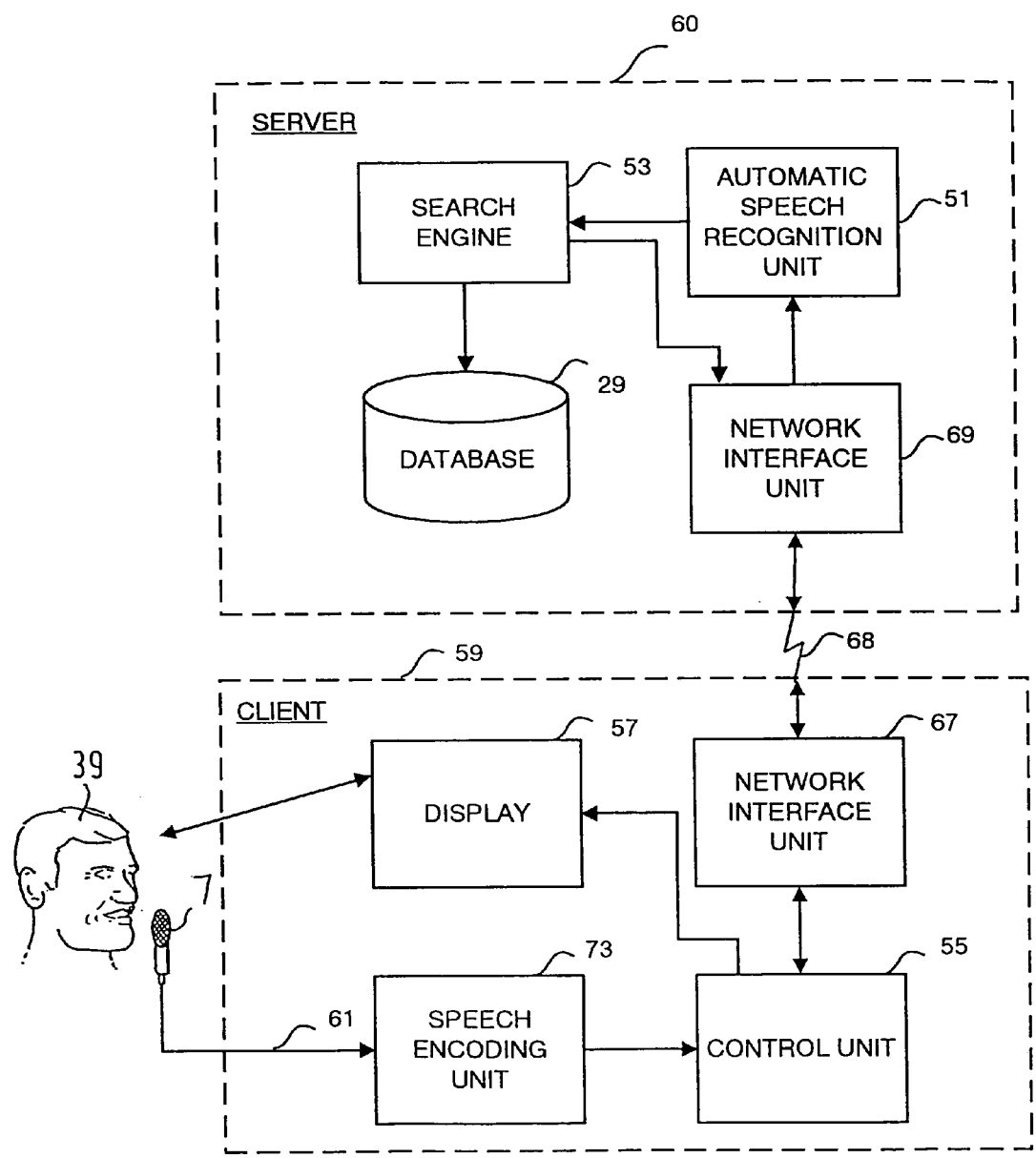

FIG. 7 is a schematic diagram which shows a first and second sequence of phonemes representative of alternative words output by the speech recognition system shown in FIG. 1, and a third sequence of phonemes which best represents the first and second sequence of phonemes, and which illustrates the possibility of there being phoneme insertions and deletions from the first and second sequence of phonemes relative to the third sequence of phonemes;

FIG. 8 schematically illustrates a search space created by the sequences of phonemes representing the alternative words together with a start null node and an end null node;

FIG. 9 is a two-dimensional plot with the horizontal axis being provided for the phonemes corresponding to one of the word alternatives and the vertical axis being provided for the phonemes corresponding to the other word alternative, and showing a number of lattice points, each corresponding to a possible match between a phoneme of the first word alternative and a phoneme of the second word alternative;

FIG. 10 schematically illustrates the dynamic programming constraints employed in the dynamic programming matching process used in this embodiment;

FIG. 11 schematically illustrates the deletion and decoding probabilities which are stored for an example phoneme and which are used in the scoring of the dynamic programming matching process employed in the present embodiment;

FIG. 12 is a flow diagram illustrating the main processing steps performed in the dynamic programming matching process;

FIG. 13 is a flow diagram illustrating the main processing steps employed to propagate dynamic programming paths from the null start node to the null end node;

FIG. 14 is a flow diagram illustrating the processing steps involved in determining a transition score for propagating a path during the dynamic programming matching process;

FIG. 15 is a flow diagram illustrating the processing steps employed in calculating scores for deletions and decodings of the first and second phoneme sequences corresponding to the word alternatives;

FIG. 16*a* is a schematic diagram of a word lattice illustrating three word alternatives output by the speech recognition system for an input spoken word;

FIG. 16*b* schematically illustrates a search space created by the three sequences of phonemes generated for the three word alternatives shown in FIG. 16*a*;

FIG. 17 is a flow diagram illustrating the main processing steps employed to propagate dynamic programming paths from the null start node to the null end node;

FIG. 18 is a flow diagram illustrating the processing steps employed in propagating a path during the dynamic programming process;

FIG. 19 is a flow diagram illustrating the processing steps involved in determining a transition score for propagating a path during the dynamic programming matching process;

FIG. 20*a* is a flow diagram illustrating a first part of the processing steps employed in calculating scores for deletions and decodings of phonemes during the dynamic programming matching process;

FIG. 20*b* is a flow diagram illustrating a second part of the processing steps employed in calculating scores for deletions and decodings of phonemes during the dynamic programming matching process;

FIG. 20*c* is a flow diagram illustrating a third part of the processing steps employed in calculating scores for deletions and decodings of phonemes during the dynamic programming matching process;

FIG. 20*d* is a flow diagram illustrating the remaining steps employed in the processing steps employed in calculating scores for deletions and decodings of phonemes during the dynamic programming matching process;

FIG. 21 is a schematic block diagram illustrating the form of an alternative user terminal which is operable to retrieve the data file from a database located within a remote server in response to an input voice query; and FIG. 22 illustrates another user terminal which allows a user to retrieve data from a database located within a remote server in response to an input voice query.

Embodiments of the present invention can be implemented using dedicated hardware circuits, but the embodiment that is to be described is implemented in computer software or code, which is run in conjunction with processing hardware such as a personal computer, workstation, photocopier, facsimile machine, personal digital assistant (PDA), web browser or the like.

Data File Annotation

FIG. 1 illustrates the form of a user terminal 59 which allows a user to input a spoken annotation via the microphone 7 for annotating a data file 91 which is to be stored in a database 29. In this embodiment, the data file 91 comprises a two dimensional image generated by, for example, a camera. The user terminal 59 allows the user 39 to annotate the 2D image with an appropriate annotation which can be used subsequently for retrieving the 2D image from the database 29. In this embodiment, the user's spoken input is converted by the automatic speech recognition unit 51 into a sequence of words with alternatives which are passed to the word to phoneme conversion unit 75. The word to phoneme conversion unit 75 determines the most probable phoneme sequence which could have been mis-recognised as the sequence of words output by the speech recognition unit 51. The way that the word to phoneme conversion unit 75 identifies this sequence of phonemes will be described later.

Figure 2:
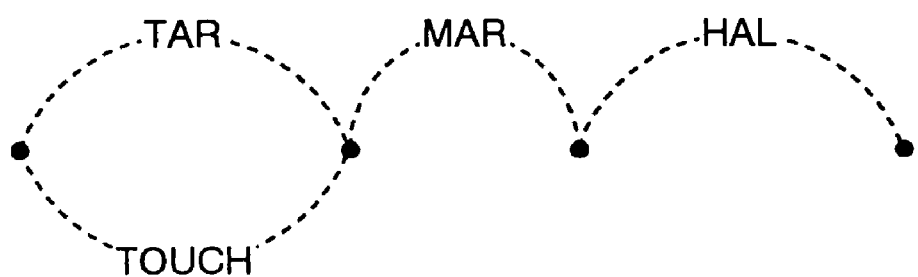
FIG. 2 is a schematic diagram of a word lattice illustrating the form of an output from an automatic speech recognition unit which forms part of the user terminal shown in FIG. 1.
Figure 3:
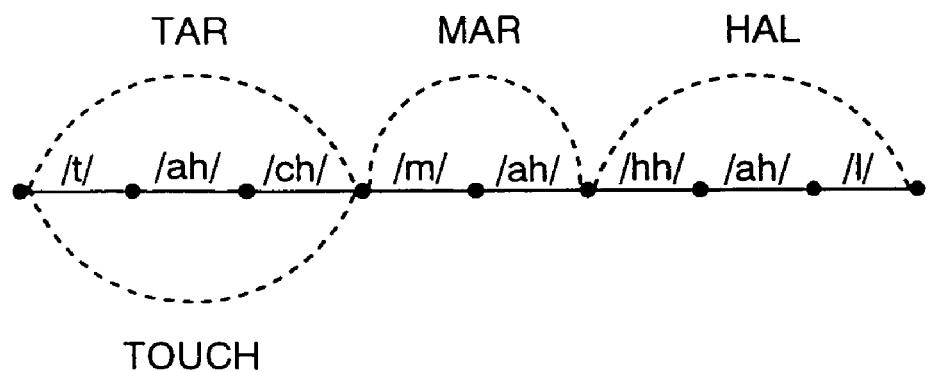
FIG. 3 is a schematic diagram of a phoneme and word lattice generated from the word lattice shown in FIG. 2 using a word-to-phoneme conversion unit which forms part of the user terminal shown in FIG. 1.

In this embodiment, this sequence of phonemes and the sequence of words are combined into a combined phoneme and word lattice. FIG. 2 illustrates a sequence of words generated by the speech recognition unit 51 in response to the spoken annotation "Taj Mahal". Since this is not a word in the automatic speech recognition unit's vocabulary, the recognition unit outputs the words which are most similar. In this case, the recogniser outputs the word sequences "tar mar hal" and "touch mar hal". FIG. 3 illustrates the combined phoneme and word lattice generated after the word to phoneme conversion unit 75 identifies the sequence of phonemes which corresponds to the words identified by the automatic speech recognition unit 51. As shown, the phoneme and word lattice is an acyclic directed graph with a single entry point and a single exit point. It is not simply a sequence of words with alternatives, since each word does not have to be replaced by a single alternative, one word can be substituted for two or more words or phonemes, and the whole structure can form a substitution for one or more words or phonemes. Therefore, the density of the data within the phoneme and word lattice annotation data essentially remains linear, rather than growing exponentially as in the case of a system which generates the N-best word lists for the spoken annotation input. This combined phoneme and word lattice is then output to the control unit 55 which, in this embodiment, appends the phoneme and word lattice as an annotation to the data file 91 which is then stored in the database 29. During this annotating step, the control unit 55 is operable to display the 2D image on the display 57, so that the user can ensure that the annotation data is associated with the correct data file 91.

In this embodiment, the annotation data generated by the automatic speech recognition unit 51 and the phonetic transcription unit 75 has the following general form:

HEADER
    flag if word if phoneme if mixed
    time index associating the location of blocks of annotation data within memory to a given time point.
    word set used (i.e. the dictionary)
    phoneme set used
    the language to which the vocabulary pertains
    phoneme probability data
Block(i) i=0, 1, 2, . . .
    node $N_j$ j=0, 1, 2 . . .
        time offset of node from start of block
        phoneme links (k) k=0, 1, 2 . . . offset to node $N_j=N_k-N_j$ ($N_k$ is node to which link K extends) or if $N_k$ is in block (i+1) offset to node $N_j=N_k+N_b-N_j$ (where $N_b$ is the number of nodes in block (i))
        phoneme associated with link (k)
        word links (l) l=0, 1, 2, . . . offset to node $N_j=N_l-N_j$ ($N_j$ is node to which link l extends) or if $N_k$ is in block (i+1) offset to node $N_j=N_k+N_b-N_j$ (where $N_b$ is the number of nodes in block (i)) word associated with link (l)

The flag identifying if the annotation data is word annotation data, phoneme annotation data or if it is mixed is provided since not all the data files within the database will include the combined phoneme and word lattice annotation data discussed above, and in this case, a different search strategy would be used to search this annotation data.

In this embodiment, the annotation data is divided into blocks of nodes in order to allow the search to jump into the middle of the annotation data for a given search. The header therefore includes a time index which associates the location of the blocks of annotation data within the memory to a given time offset between the time of start and the time corresponding to the beginning of the block.

The header also includes data defining the word set used (i.e. the dictionary), the phoneme set used and their probabilities and the language to which the vocabulary pertains. The header may also include details of the automatic speech recognition system used to generate the annotation data and any appropriate settings thereof which were used during the generation of the annotation data.

The blocks of annotation data then follow the header and identify, for each node in the block, the time offset of the node from the start of the block, the phoneme links which connect that node to other nodes by phonemes and word links which connect that node to other nodes by words. Each phoneme link and word link identifies the phoneme or word which is associated with the link. They also identify the offset to the current node. For example, if node $N_{50}$ is linked to node $N_{55}$ by a phoneme link, then the offset to node $N_{50}$ is 5. As those skilled in the art will appreciate, using an offset indication like this allows the division of the continuous annotation data into separate blocks.

As will be explained in more detail below, the use of such phoneme and word lattice annotation data allows a quick and efficient search of the database 29 to be carried out, to identify and to retrieve a desired 2D image data file stored therein. This can be achieved by firstly searching in the database 29 using the word data and, if this search fails to provide the required data file, then performing a further search using the more robust phoneme data. As those skilled in the art of speech recognition will realise, use of phoneme data is more robust because phonemes are dictionary independent and allow the system to cope with out of vocabulary words, such as names, places, foreign words etc. Use of phoneme data is also capable of making the system future-proof, since it allows data files which are placed into the database 29 to be retrieved when the original annotation was input by voice and the original automatic speech recognition system did not understand the words of the input annotation.

Data File Retrieval

Figure 4:
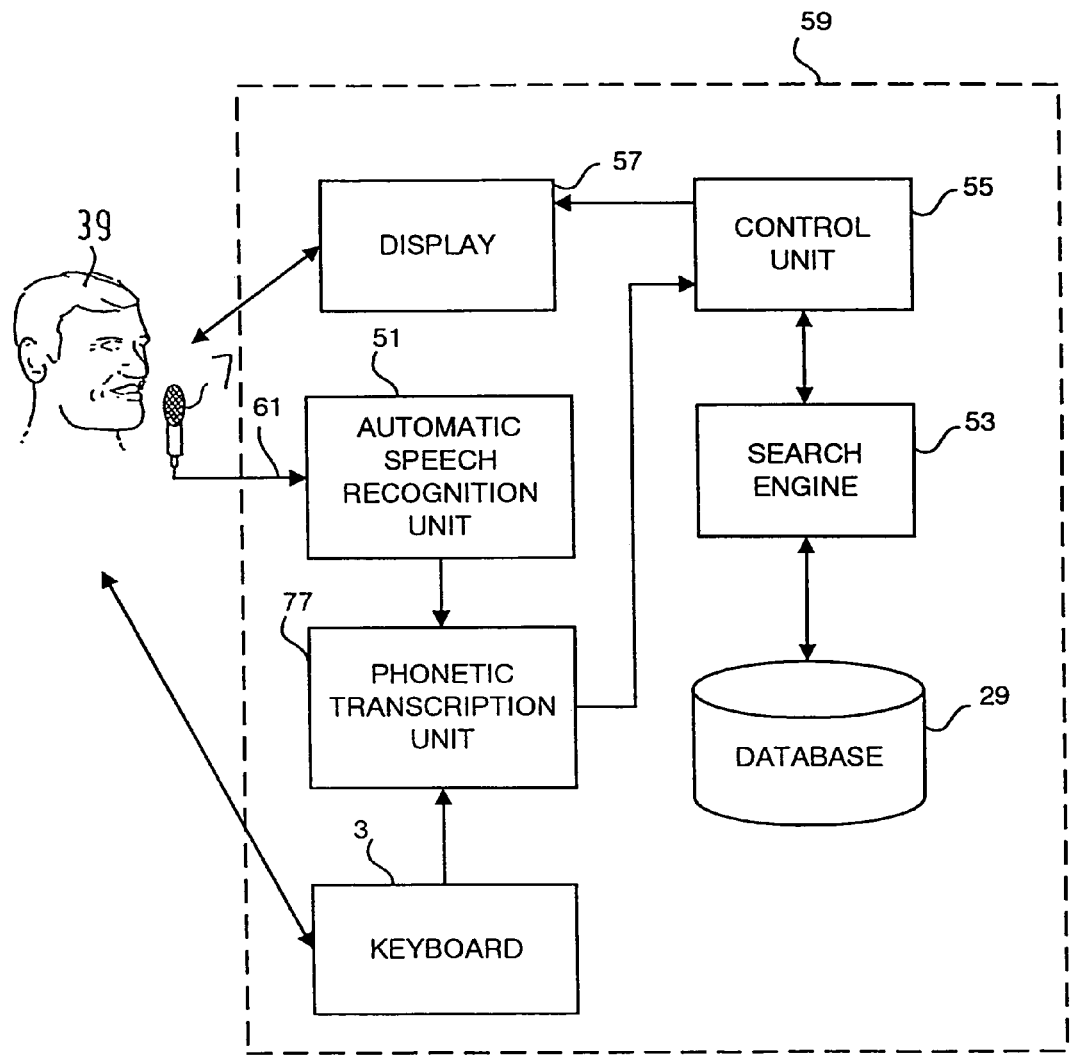
FIG. 4 is a schematic block diagram of a user terminal which allows the user to retrieve information from the database by a typed or a spoken query.

FIG. 4 is a block diagram illustrating the form of a user terminal 59 which is used, in this embodiment, to retrieve the annotated 2D images from the database 29. This user terminal 59 may be, for example, a personal computer, a hand-held device or the like. As shown, in this embodiment, the user terminal 59 comprises the database 29 of annotated 2D images, an automatic speech recognition unit 51, a phonetic transcription unit 77, a keyboard 3, a microphone 7, a search engine 53, a control unit 55 and a display 57. In operation, the user inputs either a voice query via the microphone 7 or a typed query via the keyboard 3 and the query is processed either by the automatic speech recognition unit 51 and the phonetic transcription unit 77 or by the keyboard and the phonetic transcription unit 77 to generate corresponding phoneme and word data. This data may also take the form of a phoneme and word lattice, but this is not essential. This phoneme and word data is then input to the control unit 55 which is operable to initiate an appropriate search of the database 29 using the search engine 53. The results of the search, generated by the search engine 53, are then transmitted back to the control unit 55 which analyses the search results and generates and displays appropriate display data (such as the retrieved 2D image) to the user via the display 57.

Figure 5A:
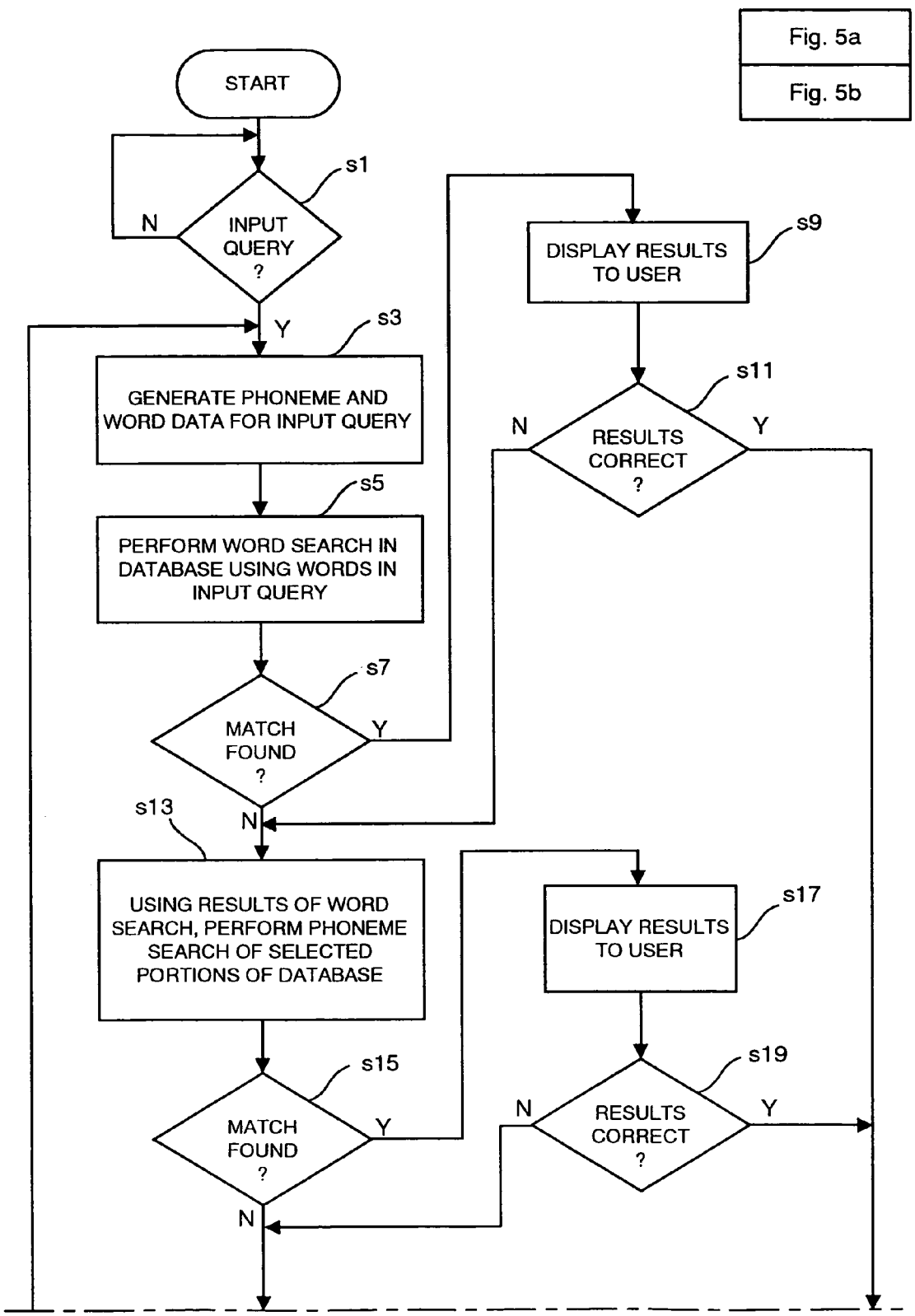
FIG. 5a is a flow diagram illustrating part of the flow control of the user terminal shown in FIG. 4 during a retrieval operation.
Figure 5B:
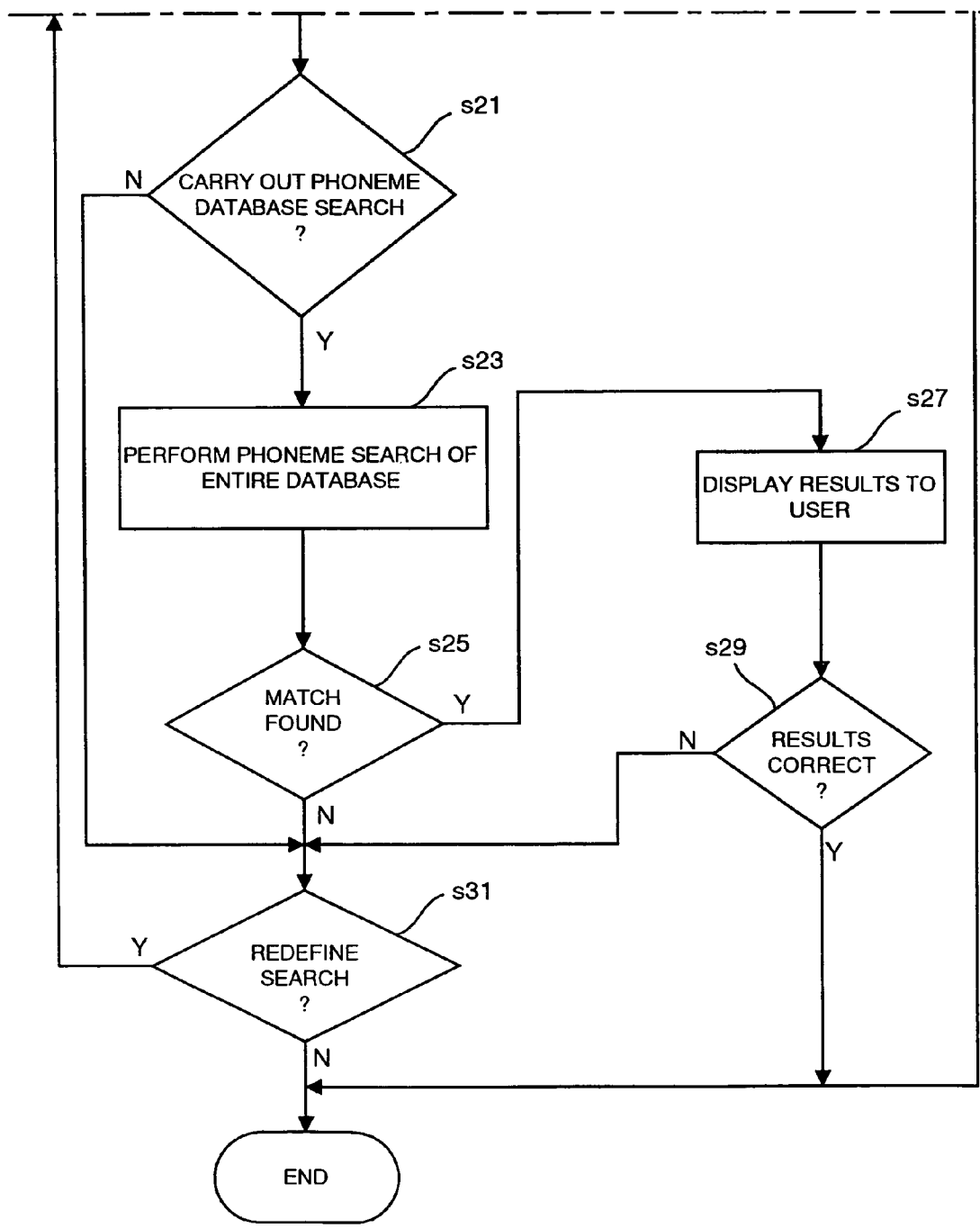
FIG. 5b is a flow diagram illustrating the remaining part of the flow control of the user terminal shown in FIG. 4 during a retrieval operation.

FIGS. 5a and 5b are flow diagrams which illustrate the way in which the user terminal 59 operates in this embodiment. In step s1, the user terminal 59 is in an idle state and awaits an input query from the user 39. Upon receipt of an input query, the phoneme and word data for the input query is generated in step s3. The control unit 55 then instructs the search engine 53, in step s5, to perform a search in the database 29 using the word data generated from the input query. The word search employed in this embodiment is conventional and will not be described in more detail here. If in step s7, the control unit 55 identifies from the search results, that a match for the user's input query has been found, then it outputs the search results to the user via the display 57.

In this embodiment, the user terminal 59 then allows the user to consider the search results and awaits the user's confirmation as to whether or not the results correspond to the information the user requires. If they are, then the processing proceeds from step s11 to the end of the processing and the user terminal 59 returns to its idle state and awaits the next input query. If, however, the user indicates (by, for example, inputting an appropriate voice command) that the search results do not correspond to the desired information, then the processing proceeds from step s11 to step s13, where the search engine 53 performs a phoneme search of the database 29. However, in this embodiment, the phoneme search performed in step s13 is not of the whole database 29, since this could take several hours depending on the size of the database 29.

Instead, in this embodiment, the phoneme search performed in step s13 uses the results of the word search performed in step s5 to identify one or more portions within the database which may correspond to the user's input query. For example, if the query comprises three words and the word search only identifies one or two of the query words in the annotation, then it performs a phoneme search of the portions of the annotations surrounding the identified word or words. Ways in which this phoneme search can be carried out are described in the Applicant's co-pending patent applications GB 9925561.4, GB 9925574.7, GB 9925576.2, and GB 9925562.2, the contents of which are incorporated herein by reference.

After the phoneme search has been performed, the control unit 55 identifies, in step s15, if a match has been found. If a match has been found, then the processing proceeds to step s17 where the control unit 55 causes the search results to be displayed to the user on the display 57. Again, the system then awaits the user's confirmation as to whether or not the search results correspond to the desired information. If the results are correct, then the processing passes from step s19 to the end and the user terminal 59 returns to its idle state and awaits the next input query. If however, the user indicates that the search results do not correspond to the desired information, then the processing proceeds from step s19 to step s21, where the control unit 55 is operable to ask the user, via the display 57, whether or not a phoneme search should be performed of the whole database 29. If in response to this query, the user indicates that such a search should be performed, then the processing proceeds to step s23 where the search engine performs a phoneme search of the entire database 29.

On completion of this search, the control unit 55 identifies, in step s25, whether or not a match for the user's input query has been found. If a match is found, then the processing proceeds to step s27 where the control unit 55 causes the search results to be displayed to the user on the display 57. If the search results are correct, then the processing proceeds from step s29 to the end of the processing and the user terminal 59 returns to its idle state and awaits the next input query. If, on the other hand, the user indicates that the search results still do not correspond to the desired information, then the processing passes to step s31 where the control unit 55 queries the user, via the display 57, whether or not the user wishes to redefine or amend the search query. If the user does wish to redefine or amend the search query, then the processing returns to step s3 where the user's subsequent input query is processed in a similar manner. If the search is not to be redefined or amended, then the search results and the user's initial input query are discarded and the user terminal 59 returns to its idle state and awaits the next input query.

A general description has been given above of the way in which a search is carried out in this embodiment by the user terminal 59 in response to an input query from a user. A more detailed description will now be given of the way in which the word to phoneme conversion unit 75 identifies the most probable phoneme sequence which could have been mis-recognised as the word alternatives output by the speech recognition unit 51.

Words to Phoneme

Figure 6:
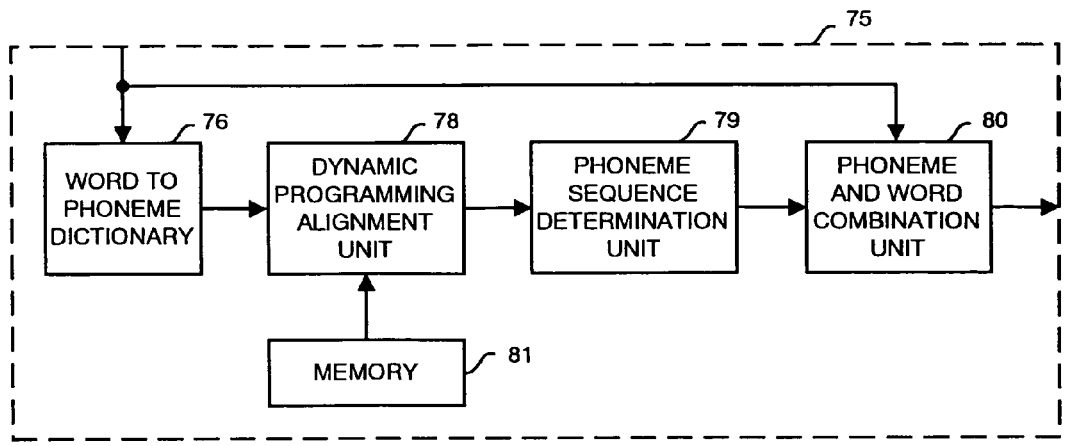
FIG. 6 is a schematic block diagram illustrating the main components of the word-to-phoneme conversion unit which forms part of the user terminal shown in FIG. 1.

As described above, where two or more word alternatives are output by the automatic speech recognition unit 51, the phoneme to word conversion unit 75 determines the most probable phoneme sequence which could have been mis-recognised as the word alternatives. FIG. 6 shows in more detail the components of the phoneme to word conversion unit 75. As shown, there is a word to phoneme dictionary 76 which is operable to receive the words output from the automatic speech recognition unit and to identify the sequence of phonemes which corresponds to each word alternative. The sequences of phonemes output by the word to phoneme dictionary 76 are then passed to a dynamic programming alignment unit 78 which, in this embodiment, uses a dynamic programming alignment technique to compare the phoneme sequences and to determine the best alignment between them. The identified alignment between the input sequences is then input to a phoneme sequence determination unit 79, which uses this alignment to determine the sequence of phonemes which matches best with the input phoneme sequences. When no alternative words are output by the automatic speech recognition unit, the phoneme to word conversion unit 75 simply uses the word to phoneme dictionary 76 to identify the corresponding sequence of phonemes for the recognised word.

When there are word alternatives, the phoneme to word conversion unit 75 essentially tries to determine the sequence of canonical phonemes representative of the text of what was actually spoken given the two word alternatives output by the speech recognition unit 51. As those skilled in the art will appreciate, each phoneme sequence representative of a word alternative can have insertions and deletions relative to this unknown canonical sequence of phonemes. This is illustrated in FIG. 7, which shows a possible matching between a first phoneme sequence (labelled $d^1_i$, $d^1_{i+1}$, $d^1_{i+2}$ ... ), a second phoneme sequence (labelled $d^2_j$, $d^2_{j+1}$, $d^2_{j+2}$ ... ) and a sequence of phonemes (labelled $p_n$, $p_{n+1}$, $p_{n+2}$ ... ) which represents the canonical sequence of phonemes of the text of what was actually spoken. As shown in FIG. 7, the dynamic programming alignment unit 78 must allow for the insertion of phonemes in both the first and second phoneme sequences (represented by the inserted phonemes $d^1_{i+3}$ and $d^2_{j+1}$) as well as the deletion of phonemes from the first and second phoneme sequences (represented by phonemes $d^1_{i+1}$ and $d^2_{j+2}$, which are both aligned with two phonemes in the canonical sequence of phonemes), relative to the canonical sequence of phonemes.

Overview of DP Alignment

As those skilled in the art of speech processing know, dynamic programming is a technique which can be used to find the optimum alignment between sequences of features, which in this embodiment are phonemes. In the simple case where there are two sequences of phonemes to be aligned, the dynamic programming alignment unit 78 does this by simultaneously propagating a plurality of dynamic programming paths, each of which represents a possible alignment between a sequence of phonemes from the first sequence and a sequence of phonemes from the second sequence. All paths begin at a start null node which is at the beginning of the two input sequences of phonemes and propagate until they reach an end null node, which is at the end of the two sequences of phonemes.

FIGS. 8 and 9 schematically illustrate the alignment which is performed and this path propagation. In particular, FIG. 8 shows a rectangular coordinate plot with the horizontal axis being provided for the first phoneme sequence and the vertical axis being provided for the second phoneme sequence. The start null node $\varnothing_s$ is provided at the top left hand corner and the end null node $\varnothing_e$ is provided at the bottom right hand corner. As shown in FIG. 9, the phonemes of the first sequence are provided along the horizontal axis and the phonemes of the second sequence are provided down the vertical axis. FIG. 9 also shows a number of lattice points, each of which represents a possible alignment (or decoding) between a phoneme of the first phoneme sequence and a phoneme of the second phoneme sequence. For example, lattice point 21 represents a possible alignment between first sequence phoneme $d^1_3$ and second sequence phoneme $d^2_1$. FIG. 9 also shows three dynamic programming paths $m_1$, $m_2$ and $m_3$ which represent three possible alignments between the first and second phoneme sequences and which begin at the start null node $\varnothing_s$ and propagate through the lattice points to the end null node $\varnothing_e$.

In order to determine the best alignment between the first and second phoneme sequences, the dynamic programming alignment unit 78 keeps a score for each of the dynamic programming paths which it propagates, which score is dependent upon the overall similarity of the phonemes which are aligned along the path. Additionally, in order to limit the number of deletions and insertions of phonemes in the sequences being aligned, the dynamic programming process places certain constraints on the way in which each dynamic programming path can propagate.

FIG. 10 shows the dynamic programming constraints which are used in this embodiment. In particular, if a dynamic programming path ends at lattice point (i,j), representing an alignment between phoneme $d^1_i$ of the first phoneme sequence and phoneme $d^2_j$ of the second phoneme sequence, then that dynamic programming path can propagate to the lattice points (i+1,j), (i+2,j), (i+3,j), (i,j+1), (i+1,j+1), (i+2,j+1), (i,j+2), (i+1,j+2) and (i,j+3). These propagations therefore allow the insertion and deletion of phonemes in the first and second phoneme sequences relative to the unknown canonical sequence of phonemes corresponding to the text of what was actually spoken.

As mentioned above, the dynamic programming alignment unit 78 keeps a score for each of the dynamic programming paths, which score is dependent upon the similarity of the phonemes which are aligned along the path. Therefore, when propagating a path ending at point (i,j) to these other points, the dynamic programming process adds the respective "cost" of doing so to the cumulative score for the path ending at point (i,j), which is stored in a store (SCORE(i,j)) associated with that point. In this embodiment, this cost includes insertion probabilities for any inserted phonemes, deletion probabilities for any deletions and decoding probabilities for a new alignment between a phoneme from the first phoneme sequence and a phoneme from the second phoneme sequence. In particular, when there is an insertion, the cumulative score is multiplied by the probability of inserting the given phoneme; when there is a deletion, the cumulative score is multiplied by the probability of deleting the phoneme; and when there is a decoding, the cumulative score is multiplied by the probability of decoding the two phonemes.

In order to be able to calculate these probabilities, the system stores a probability for all possible phoneme combinations in memory 81. In this embodiment, the deletion of a phoneme from either the first or second phoneme sequence is treated in a similar manner to a decoding. This is achieved by simply treating a deletion as another phoneme. Therefore, if there are 43 phonemes known to the system, then the system will store one thousand eight hundred and ninety two (1892=43×44) decoding/deletion probabilities, one for each possible phoneme decoding and deletion. This is illustrated in FIG. 11, which shows the possible phoneme decodings which are stored for the phoneme /ax/ and which includes the deletion phoneme (Ø) as one of the possibilities. As those skilled in the art will appreciate, all the decoding probabilities for a given phoneme must sum to one, since there are no other possibilities. In addition to these decoding/deletion probabilities, 43 insertion probabilities (PI( )), one for each possible phoneme insertion, is also stored in the memory 81. As will be described later, these probabilities are determined in advance from training data.

In this embodiment, to calculate the probability of decoding a phoneme ($d^2_j$) from the second phoneme sequence as a phoneme ($d^1_i$) from the first phoneme sequence, the system sums, over all possible phonemes p, the probability of decoding the phoneme p as the first sequence phoneme $d^1_i$ and as the second sequence phoneme $d^2_j$, weighted by the probability of phoneme p occurring unconditionally, i.e.:

$$P(d^1_i|d^2_j) = \sum_{r=1}^{N_p} P(d^1_i|p_r)P(d^2_j|p_r)P(p_r) \quad (1)$$

where $N_p$ is the total number of phonemes known to the system; $p(d^1_i|p_r)$ is the probability of decoding phoneme $p_r$ as the first sequence phoneme $d^1_i$; $P(d^2_j|p_r)$ is the probability of decoding phoneme $p_r$ as the second sequence phoneme $d^2_j$; and $P(p_r)$ is the probability of phoneme $p_r$ occurring unconditionally.

To illustrate the score propagations, an example will now be considered. In particular, when propagating from lattice point (i,j) to lattice point (i+2,j+1), the phoneme $d^1_{i+1}$ from the first phoneme sequence is inserted relative to the second phoneme sequence and there is a decoding between phoneme $d^1_{i+2}$ from the first phoneme sequence and phoneme $d^2_{j+1}$ from the second phoneme sequence. Therefore, the score propagated to point (i+2,j+1) is given by:

$$S(i+2,j+1) = S(i,j) \cdot PI(d^1_{i+1}) \cdot \sum_{r=1}^{N_p} P(d^1_{i+2}|p_r)P(d^2_{j+1}|p_r)P(p_r) \quad (2)$$

As those skilled in the art will appreciate, during this path propagation, several paths will meet at the same lattice point. In order that the best path is propagated, a comparison between the scores is made at each lattice point and the path having the best score is continued whilst the other path(s) is (are) discarded.

In order that the best alignment between the two input phoneme sequences can be determined, where paths meet and paths are discarded, a back pointer is stored pointing to the lattice point from which the path which was not discarded, propagated. In this way, once the dynamic programming alignment unit 78 has propagated the paths through to the null end node and the path having the overall best score has been determined, a back tracking routine can be used to identify the best alignment of the phonemes in the two input phoneme sequences. The phoneme sequence determination unit 79 then uses this alignment, to determine the sequence of phonemes which best represents the input phoneme sequences. The way in which this is achieved in this embodiment will be described later.

Detailed Description of DP Alignment

A more detailed description will now be given of the operation of the dynamic programming alignment unit 78 when two sequences of phonemes, for two word alternatives output by the automatic speech recognition unit 51, are aligned. Initially, the alignment unit 78 propagates paths from the null start node ($Ø_s$) to all possible start points defined by the dynamic programming constraints discussed above. The dynamic programming score for the paths that are started are then set to equal the transition score for passing from the null start node to the respective start point. The paths which are started in this way are then propagated through the array of lattice points defined by the first and second phoneme sequences until they reach the null end node $Ø_e$. To do this, the alignment unit 78 processes the array of lattice points column by column in a raster like technique.

The control algorithm used to control this raster processing operation is shown in FIG. 12. As shown, in step s149, the system initialises a first phoneme sequence loop pointer, i, and a second phoneme loop pointer, j, to zero. Then in step s151, the system compares the first phoneme sequence loop pointer i with the number of phonemes in the first phoneme sequence (Nseq1). Initially the first phoneme sequence loop pointer i is set to zero and the processing therefore proceeds to step s153 where a similar comparison is made for the second phoneme sequence loop pointer j relative to the total number of phonemes in the second phoneme sequence (Nseq2). Initially the loop pointer j is also set to zero and therefore the processing proceeds to step s155 where the system propagates the path ending at lattice point (i,j) using the dynamic programming constraints discussed above. The way in which the system propagates the paths in step s155 will be described in more detail later. After step s155, the loop pointer j is incremented by one in step s157 and the processing returns to step s153. Once this processing has looped through all the phonemes in the second phoneme sequence (thereby processing the current column of lattice points), the processing proceeds to step s159 where the loop pointer j is reset to zero and the loop pointer i is incremented by one. The processing then returns to step s151 where a similar procedure is performed for the next column of lattice points. Once the last column of lattice points has been processed, the processing proceeds to step s161 where the loop pointer i is reset to zero and the processing ends.

Propagate

In step s155 shown in FIG. 12, the system propagates the path ending at lattice point (i,j) using the dynamic programming constraints discussed above. FIG. 13 is a flowchart which illustrates the processing steps involved in performing this propagation step. As shown, in step s211, the system sets the values of two variables mxi and mxj and initialises first phoneme sequence loop pointer i2 and second phoneme sequence loop pointer j2. The loop pointers i2 and j2 are provided to loop through all the lattice points to which the path ending at point (i,j) can propagate to and the variables mxi and mxj are used to ensure that i2 and j2 can only take the values which are allowed by the dynamic programming constraints. In particular, mxi is set equal to i plus mxhops (which is a constant having a value which is one more than the maximum number of "hops" allowed by the dynamic programming constraints and in this embodiment is set to a value of four, since a path can jump at most to a phoneme that is three phonemes further along the sequence), provided this is less than or equal to the number of phonemes in the first phoneme sequence, otherwise mxi is set equal to the number of phonemes in the first phoneme sequence (Nseq1). Similarly, mxj is set equal to j plus mxhops, provided this is less than or equal to the number of phonemes in the second phoneme sequence, otherwise mxj is set equal to the number of phonemes in the second phoneme sequence (Nseq2). Finally, in step s211, the system initialises the first phoneme sequence loop pointer i2 to be equal to the current value of the first phoneme sequence loop pointer i and the second phoneme sequence loop pointer j2 to be equal to the current value of the second phoneme sequence loop pointer j.

The processing then proceeds to step s219 where the system compares the first phoneme sequence loop pointer i2 with the variable mxi. Since loop pointer i2 is set to i and mxi is set equal to i+4, in step s211, the processing will proceed to step s221 where a similar comparison is made for the second phoneme sequence loop pointer j2. The processing then proceeds to step s223 which ensures that the path does not stay at the same lattice point (i,j) since initially, i2 will equal i and j2 will equal j. Therefore, the processing will initially proceed to step s225 where the query phoneme loop pointer j2 is incremented by one.

The processing then returns to step s221 where the incremented value of j2 is compared with mxj. If j2 is less than mxj, then the processing returns to step s223 and then proceeds to step s227, which is operable to prevent too large a hop along both phoneme sequences. It does this by ensuring that the path is only propagated if i2+j2 is less than i+j+mxhops. This ensures that only the triangular set of points shown in FIG. 10 are processed. Provided this condition is met, the processing proceeds to step s229 where the system calculates the transition score (TRANSCORE) from lattice point (i,j) to lattice point (i2,j2). In this embodiment, the transition and cumulative scores are probability based and they are combined by multiplying the probabilities together. However, in this embodiment, in order to remove the need to perform multiplications and in order to avoid the use of high floating point precision, the system employs log probabilities for the transition and cumulative scores. Therefore, in step s231, the system adds this transition score to the cumulative score stored for the point (i,j) and copies this to a temporary store, TEMPSCORE.

As mentioned above, in this embodiment, if two or more dynamic programming paths meet at the same lattice point, the cumulative scores associated with each of the paths are compared and all but the best path (i.e. the path having the best score) are discarded. Therefore, in step s233, the system compares TEMPSCORE with the cumulative score already stored for point (i2,j2) and the largest score is stored in SCORE (i2,j2) and an appropriate back pointer is stored to identify which path had the larger score. The processing then returns to step s225 where the loop pointer j2 is incremented by one and the processing returns to step s221. Once the second phoneme sequence loop pointer j2 has reached the value of mxj, the processing proceeds to step s235, where the loop pointer j2 is reset to the initial value j and the first phoneme sequence loop pointer i2 is incremented by one. The processing then returns to step s219 where the processing begins again for the next column of points shown in FIG. 10. Once the path has been propagated from point (i,j) to all the other points shown in FIG. 10, the processing ends.

Transition Score

In step s229 the transition score from one point (i,j) to another point (i2,j2) is calculated. This involves calculating the appropriate insertion probabilities, deletion probabilities and decoding probabilities relative to the start point and end point of the transition. The way in which this is achieved in this embodiment, will now be described with reference to FIGS. 14 and 15.

In particular, FIG. 14 shows a flow diagram which illustrates the general processing steps involved in calculating the transition score for a path propagating from lattice point (i,j) to lattice point (i2,j2). In step s291, the system calculates, for each first sequence phoneme which is inserted between point (i,j) and point (i2,j2), the score for inserting the inserted phoneme(s) (which is just the log of probability PI( ) discussed above) and adds this to an appropriate store, INSERTSCORE. The processing then proceeds to step s293 where the system performs a similar calculation for each second sequence phoneme which is inserted between point (i,j) and point (i2,j2) and adds this to INSERTSCORE. As mentioned above, the scores which are calculated are log based probabilities, therefore the addition of the scores in INSERTSCORE corresponds to the multiplication of the corresponding insertion probabilities. The processing then proceeds to step s295 where the system calculates (in accordance with equation (1) above) the scores for any deletions and/or any decodings in propagating from point (i,j) to point (i2,j2) and these scores are added and stored in an appropriate store, DELSCORE. The processing then proceeds to step s297 where the system adds INSERTSCORE and DELSCORE and copies the result to TRANSCORE.

The processing involved in step s295 to determine the deletion and/or decoding scores in propagating from point (i,j) to point (i2,j2) will now be described in more detail with reference to FIG. 15.

As shown, initially in step s325, the system determines if the first phoneme sequence loop pointer i2 equals first phoneme sequence loop pointer i. If it does, then the processing proceeds to step s327 where a phoneme loop pointer r is initialised to one. The phoneme pointer r is used to loop through each possible phoneme known to the system during the calculation of equation (1) above. The processing then proceeds to step s329, where the system compares the phoneme pointer r with the number of phonemes known to the system, Nphonemes (which in this embodiment equals 43). Initially r is set to one in step s327, therefore the processing proceeds to step s331 where the system determines the log probability of phoneme $p_r$ occurring (i.e. log $P(p_r)$) and copies this to a temporary score TEMPDELSCORE. If first phoneme sequence loop pointer i2 equals annotation phoneme i, then the system is propagating the path ending at point (i,j) to one of the points (i,j+1), (i,j+2) or (i,j+3). Therefore, there is a phoneme in the second phoneme sequence which is not in the first phoneme sequence. Consequently, in step s333, the system adds the log probability of deleting phoneme $p_r$ from the first phoneme sequence (i.e. log $P(\emptyset|p_r)$) to TEMPDELSCORE. The processing then proceeds to step s335, where the system adds the log probability of decoding phoneme $p_r$ as second sequence phoneme $d^2_{j2}$ (i.e. log $P(d^2_{j2}|p_r)$) to TEMPDELSCORE. The processing then proceeds to step s337 where a "log addition" of TEMPDELSCORE and DELSCORE is performed and the result is stored in DELSCORE. In this embodiment, since the calculation of decoding probabilities (in accordance with equation (1) above) involves summations and multiplications of probabilities, and since we are using log probabilities this "log addition" operation effectively converts TEMDELSCORE and DELSCORE from log probabilities back to probabilities, adds them and then reconverts them back to log probabilities. This "log addition" is a well known technique in the art of speech processing and is described in, for example, the book entitled "Automatic Speech Recognition. The development of the (Sphinx) system" by Lee, Kai-Fu published by Kluwer Academic Publishers, 1989, at pages 28 and 29. After step s337, the processing proceeds to step s339 where the phoneme loop pointer r is incremented by one and then the processing returns to step s329 where a similar processing is performed for the next phoneme known to the system. Once this calculation has been performed for each of the 43 phonemes known to the system, the processing ends.

If at step s325, the system determines that i2 is not equal to i, then the processing proceeds to step s341 where the system determines if the second phoneme sequence loop pointer j2 equals second phoneme sequence loop pointer j. If it does, then the processing proceeds to step s343 where the phoneme loop pointer r is initialised to one. The processing then proceeds to step s345 where the phoneme loop pointer r is compared with the total number of phonemes known to the system (Nphonemes). Initially r is set to one in step s343, and therefore, the processing proceeds to step s347 where the log probability of phoneme $p_r$ occurring is determined and copied into the temporary store TEMPDELSCORE. The processing then proceeds to step s349 where the system determines the log probability of decoding phoneme $p_r$ as first sequence phoneme $d^1_{i2}$ and adds this to TEMPDELSCORE. If the second phoneme sequence loop pointer j2 equals loop pointer j, then the system is propagating the path ending at point (i,j) to one of the points (i+1,j), (i+2,j) or (i+3,j). Therefore, there is a phoneme in the first phoneme sequence which is not in the second phoneme sequence. Consequently, in step s351, the system determines the log probability of deleting phoneme $p_r$ from the second phoneme sequence and adds this to TEMPDELSCORE. The processing then proceeds to step s353 where the system performs the log addition of TEMPDELSCORE with DELSCORE and stores the result in DELSCORE. The phoneme loop pointer r is then incremented by one in step s355 and the processing returns to step s345. Once the processing steps s347 to s353 have been performed for all the phonemes known to the system, the processing ends.

If at step s341, the system determines that second phoneme sequence loop pointer j2 is not equal to loop pointer j, then the processing proceeds to step s357 where the phoneme loop pointer r is initialised to one. The processing then proceeds to step s359 where the system compares the phoneme counter r with the number of phonemes known to the system (Nphonemes). Initially r is set to one in step s357, and therefore, the processing proceeds to step s361 where the system determines the log probability of phoneme $p_r$ occurring and copies this to the temporary score TEMPDELSCORE. If the loop pointer j2 is not equal to loop pointer j, then the system is propagating the path ending at point (i,j) to one of the points (i+1,j+1), (i+1,j+2) and (i+2,j+1). Therefore, there are no deletions, only insertions and decodings. The processing therefore proceeds to step s363 where the log probability of decoding phoneme $p_r$ as first sequence phoneme $d^{i2}$ is added to TEMPDELSCORE. The processing then proceeds to step s365 where the log probability of decoding phoneme $p_r$ as second sequence phoneme $d^2_{j2}$ is determined and added to TEMPDELSCORE. The system then performs, in step s367, the log addition of TEMPDELSCORE with DELSCORE and stores the result in DELSCORE. The phoneme counter r is then incremented by one in step s369 and the processing returns to step s359. Once processing steps s361 to s367 have been performed for all the phonemes known to the system, the processing ends. Backtracking and Phoneme Sequence Generation As mentioned above, after the dynamic programming paths have been propagated to the null end node $\emptyset_e$, the path having the best cumulative score is identified and the dynamic programming alignment unit 78 backtracks through the back pointers which were stored in step s233 for the best path, in order to identify the best alignment between the two input sequences of phonemes. In this embodiment, the phoneme sequence determination unit 79 then determines, for each aligned pair of phonemes ($d^1_m$, $d^2_n$) of the best alignment, the unknown phoneme, p, which maximises the following probability:

$$P(d_m^1|p)P(d_n^2|p)P(p) \qquad (3)$$

using the decoding probabilities discussed above which are stored in memory 81. This phoneme, p, is the phoneme which is taken to best represent the aligned pair of phonemes. By identifying phoneme, p, for each aligned pair, the determination unit 79 identifies the sequence of canonical phonemes that best represents the two input phoneme sequences. In this embodiment, this canonical sequence is then output by the determination unit 79 to the phoneme and word combination unit 80 which combines this phoneme sequence with the corresponding word alternatives to generate the above mentioned phoneme and word lattice. As mentioned above, this lattice is then output to the control unit 55 shown in FIG. 1, which is operable to append the annotation to the corresponding data file 91.

A description has been given above of the way in which the dynamic programming alignment unit 78 aligns two sequences of phonemes and the way in which the phoneme sequence determination unit 79 obtains the sequence of phonemes which best represents the two input sequences given this best alignment. As those skilled in the art will appreciate the automatic speech recognition unit 51 will often generate more than just one word alternative. Further, more than one phoneme sequence may be stored for each of the word alternatives in the word to phoneme dictionary 76. Therefore, the dynamic programming alignment unit 78 must be able to align any number of input phoneme sequences and the determination unit 79 must be able to derive the phoneme sequence which best represents any number of input phoneme sequences given the best alignment between them. A description will now be given of the way in which the dynamic programming alignment unit 78 aligns three phoneme sequences together and how the determination unit 79 determines the phoneme sequence which best represents the three input phoneme sequences. These three sequences may represent, for example, the phoneme sequences output by the word to phoneme dictionary 76 for the three word alternatives "late", "bait" and "plate" shown in FIG. 16*a*.

FIG. 16*b* shows a three-dimensional coordinate plot with one dimension being provided for each of the three phoneme sequences and illustrates the three-dimensional lattice of points which are processed by the dynamic programming alignment unit 78 in this case. The alignment unit 78 uses the same transition scores, dynamic programming constraints and phoneme probabilities in order to propagate and score each of the paths through the three-dimensional network of lattice points in the plot shown in FIG. 16*b*.

A detailed description will now be given with reference to FIGS. 17 to 20 of the three-dimensional dynamic programming alignment carried out by the alignment unit 78 in this case. As those skilled in the art will appreciate from a comparison of FIGS. 17 to 20 with FIGS. 12 to 15, the three-dimensional dynamic programming process that is performed is essentially the same as the two-dimensional dynamic programming process performed when there were only two input phoneme sequences, except with the addition of a few further control loops in order to take into account the extra phoneme sequence.

As in the first case, the dynamic programming alignment unit 78 initially propagates dynamic programming paths from the null start node $\emptyset_s$ to each of the start points defined by the dynamic programming constraints. It then propagates these paths from these start points to the null end node $\emptyset_e$ by processing the points in the search space in a raster-like fashion. The control algorithm used to control this raster processing operation is shown in FIG. 17. As can be seen from a comparison of FIG. 17 with FIG. 12, this control algorithm has the same general form as the control algorithm used when there were only two phoneme sequences to be aligned. The only differences are in the more complex propagation step s419 and in the provision of query block s421, block s423 and block s425 which are needed in order to process the additional lattice points caused by the third phoneme sequence. For a better understanding of how the control algorithm illustrated in FIG. 17 operates, the reader is referred to the description given above of FIG. 12.

FIG. 18 is a flowchart which illustrates the processing steps involved in the propagation step s419 shown in FIG. 17. FIG. 13 shows the corresponding flowchart for the two-dimensional case described above. As can be seen from a comparison of FIG. 18 with FIG. 13, the main differences between the two flowcharts are the additional variables (mxk and k2) and processing blocks (s451, s453, s455 and s457) which are required to process the additional lattice points due to the third phoneme sequence. For a better understanding of the processing steps involved in the flowchart shown in FIG. 18, the reader is referred to the description of FIG. 13.

FIG. 19 is a flowchart illustrating the processing steps involved in calculating the transition score when a dynamic programming path is propagated from point (i,j,k) to point (i2, j2, k2) during the processing steps in FIG. 18. FIG. 14 shows the corresponding flowchart for the two-dimensional case described above. As can be seen from comparing FIG. 19 to FIG. 14, the main difference between the two flowcharts is the additional process step s461 for calculating the insertion probabilities for inserted phonemes in the third phoneme sequence. Therefore, for a better understanding of the processing steps involved in the flowchart shown in FIG. 19, the reader is referred to the description of FIG. 14.

The processing steps involved in step s463 in FIG. 19 to determine the deletion and/or decoding scores in propagating from point (i,j,k) to point (i2,j2,k2) will now be described in more detail with reference to FIG. 20. Initially, the system determines (in steps s525 to s537) if there are any phoneme deletions from any of the three phoneme sequences by comparing i2, j2 and k2 with i, j and k respectively. As shown in FIGS. 20*a* to 20*d*, there are eight main branches which operate to determine the appropriate decoding and deletion probabilities for the eight possible situations. Since the processing performed in each situation is very similar, a description will only be given of one of the situations.

In particular, if at steps s525, s527 and s531, the system determines that there has been a deletion from the first phoneme sequence (because i2=i) and that there are no deletions from the other two phoneme sequences (because j2≠j and k2≠k), then the processing proceeds to step s541 where a phoneme loop pointer r is initialised to one. The phoneme loop pointer r is used to loop through each possible phoneme known to the system during the calculation of an equation similar to equation (1) described above. The processing then proceeds to step s543 where the system compares the phoneme pointer r with the number of phonemes known to the system, Nphonemes (which in this embodiment equals 43). Initially, r is set to one in step s541. Therefore the processing proceeds to step s545 where the system determines the log probability of phoneme $p_r$ occurring and copies this to a temporary score TEMPDELSCORE. The processing then proceeds to step s547 where the system determines the log probability of deleting phoneme $p_r$ in the first phoneme sequence and adds this to TEMPDELSCORE. The processing then proceeds to step s549 where the system determines the log probability of decoding phoneme $p_r$ as second sequence phoneme $d^2_{j2}$ and adds this to TEMPDELSCORE. The processing then proceeds to step s551 where the system determines the log probability of decoding phoneme $p_r$ as third sequence phoneme $d^3_{k2}$ and adds this to TEMPDELSCORE. The processing then proceeds to step s553 where the system performs the log addition of TEMPDELSCORE with DELSCORE and stores the result in DELSCORE. The processing then proceeds to step s555 where the phoneme pointer r is incremented by one. The processing then returns to step s543 where a similar processing is performed for the next phoneme known to the system. Once this calculation has been performed for each of the 43 phonemes known to the system, the processing ends.

As can be seen from a comparison of the processing steps performed in FIG. 20 and the steps performed in FIG. 15, the term calculated within the dynamic programming algorithm for decodings and deletions is similar to equation (1) but has an additional probability term for the third phoneme sequence. In particular, it has the following form:

$$\sum_{r=1}^{N_p} P(d_i^1|p_r)P(d_j^2|p_r)P(d_k^3|p_r)P(p_r) \quad (4)$$

As with the two dimensional case, after the dynamic programming paths have been propagated through to the null end node $\emptyset_e$, the dynamic programming alignment unit 78 identifies the path having the best score and uses the back pointers which have been stored for this path to identify the aligned phoneme triples (i.e. the aligned phonemes in the three sequences) which lie along this best path. In this embodiment, for each of these aligned phoneme triples ($d^1_m$, $d^2_n$, $d^3_o$), the phoneme sequence determination unit 79 determines the phoneme, p, which maximises:

$$P(d_m^1|p)P(d_n^2|p)P(d_o^3|p)P(p) \quad (5)$$

in order to generate the canonical sequence of phonemes which best represents the three input phoneme sequences. Again, in this embodiment, this canonical sequence is then output to the phoneme and word combination unit 80, where it is combined with the word alternatives to generate the above mentioned phoneme and word lattice.

A description has been given above of the way in which the dynamic programming alignment unit 78 aligns two or three sequences of phonemes. As has been demonstrated for the three phoneme sequence case, the addition of a further phoneme sequence simply involves the addition of a number of loops in the control algorithm in order to account for the additional phoneme sequence. As those skilled in the art will appreciate, the alignment unit 78 can therefore identify the best alignment between any number of input phoneme sequences by identifying how many sequences are input and then ensuring that appropriate control variables are provided for each input sequence. The determination unit 79 can then identify the sequence of phonemes which best represents the input phoneme sequences using these alignment results.

Training

In the above embodiment, the dynamic programming alignment unit 78 used 1892 decoding/deletion probabilities and 43 insertion probabilities to score the dynamic programming paths in the phoneme alignment operation. In this embodiment, these probabilities are determined in advance during a training session and are stored in the memory 81. In particular, during this training session, a speech recognition system is used to provide a phoneme decoding of speech in two ways. In the first way, the speech recognition system is provided with both the speech and the actual words which are spoken.

The speech recognition unit can therefore use this information to generate the canonical phoneme sequence of the spoken words to obtain an ideal decoding of the speech. The speech recognition system is then used to decode the same speech, but this time without knowledge of the actual words spoken (referred to hereinafter as the free decoding). The phoneme sequence generated from the free decoding will differ from the canonical phoneme sequence in the following ways:

i) the free decoding may make mistakes and insert phonemes into the decoding which are not present in the canonical sequence or, alternatively, omit phonemes in the decoding which are present in the canonical sequence;
ii) one phoneme may be confused with another; and
iii) even if the speech recognition system decodes the speech perfectly, the free decoding may nonetheless differ from the canonical decoding due to the differences between conversational pronunciation and canonical pronunciation, e.g., in conversational speech the word "and" (whose canonical forms are /ae/ /n/ /d/ and /ax/ /n/ /d/) is frequently reduced to /ax/ /n/ or even /n/.

Therefore, if a large number of utterances are decoded into their canonical forms and their free decoded forms, then a dynamic programming method (similar to the one described above) can be used to align the two. This provides counts of what was decoded, d, when the phoneme should, canonically, have been a p. From these training results, the above decoding, deletion and insertion probabilities can be approximated in the following way.

The probability that phoneme, d, is an insertion is given by:

$$PI(d) = \frac{I_d}{n_o^d} \quad (6)$$

where $I_d$ is the number of times the automatic speech recognition system inserted phoneme d and $n_o^d$ is the total number of decoded phonemes which are inserted relative to the canonical sequence.

The probability of decoding phoneme p as phoneme d is given by:

$$P(d|p) = \frac{c_{dp}}{n_p} \quad (7)$$

where $c_{dp}$ is the number of times the automatic speech recognition system decoded d when it should have been p and $n_p$ is the number of times the automatic speech recognition system decoded anything (including a deletion) when it should have been p.

The probability of not decoding anything (i.e. there being a deletion) when the phoneme p should have been decoded is given by:

$$P(\phi|p) = \frac{O_p}{n_p} \quad (8)$$

where $O_p$ is the number of times the automatic speech recognition system decoded nothing when it should have decoded p and $n_p$ is the same as above.

Alternative Embodiments

As those skilled in the art will appreciate, whilst the term "phoneme" has been used throughout the above description, the present application is not limited to its linguistic meaning, but includes the different sub-word units that are normally identified and used in standard speech recognition systems. In particular, the term "phoneme" covers any such sub-word unit, such as phones, syllables or katakana (Japanese alphabet).

As those skilled in the art will appreciate, the above description of the dynamic programming alignment of the sequences of phonemes was given by way of example only and various modifications can be made. For example, whilst a raster scanning technique for propagating the paths through the lattice points was employed, other techniques could be employed which progressively propagate the paths through the lattice points. Additionally, as those skilled in the art will appreciate, dynamic programming constraints other than those described above may be used to control the matching process.

In the above embodiment, the dynamic programming alignment unit calculated decoding scores for each transition using equation (1) above. Instead of summing over all possible phonemes known to the system in accordance with equation (1), the dynamic programming alignment unit may be arranged, instead, to identify the unknown phoneme, p, which maximises the probability term within the summation and to use this maximum probability as the probability of decoding the corresponding phonemes in the input sequences. In such an embodiment, the dynamic programming alignment unit would also preferably store an indication of the phoneme which maximised this probability with the appropriate back pointer, so that after the best alignment between the input phoneme sequences has been determined, the sequence of phonemes which best represents the input sequences can simply be determined by the phoneme sequence determination unit from this stored data.

In the above embodiment, the annotation which is added to the data file includes both phoneme data and word data in the form of a phoneme and word lattice. As those skilled in the art will appreciate, this form of annotation data is not essential. The phoneme and word data may be added separately to the data file. Further, in some embodiments, only the phoneme data generated by the word to phoneme conversion unit may be appended to the data file.

In the above embodiment, a hierarchical type search of the annotation data was performed in response to a query input by the user. In particular, the search strategy involved performing a word search and then, using the results of the word search, performing a phoneme search. As those skilled in the art will appreciate, other searching strategies may be employed. For example, both a phoneme and a word search may be performed in parallel, with the data files being retrieved in dependence upon the results of both the searches. In such an embodiment, in order to reduce the amount of phoneme searching required, indexing techniques may be used.

In the above embodiments, a speech recognition system was used to generate sequences of words representative of a spoken annotation. A word to phoneme conversion unit was then used to generate a sequence of phonemes representative of these words. As those skilled in the art will appreciate, the sequence of input words to the words to phoneme conversion unit may be generated from a handwriting recognition system. In this case, the confusion probabilities would represent the graphical confusion of the sub-word units rather than the pronunciation confusion between the sub-word units.

In the above embodiment, pictures were annotated using the phoneme and word lattice annotation data. As those skilled in the art will appreciate, the annotation data can be used to annotate many different types of data files. For example, this annotation data can be used in medical applications for annotating x-rays of patients, 3D videos of, for example, NMR scans, ultrasound scans etc. It can also be used to annotate 1D data, such as audio data or seismic data.

In the above embodiments, during both the annotation and the subsequent retrieval, the automatic speech recognition system used only generated sequences of words and these sequences were transformed into one or more sequences of phonemes using a word to phoneme dictionary. As those skilled in the art will appreciate, different speech recognition systems may be used during the annotation stage and the subsequent retrieval stage. For example, after the data file has been annotated, a speech recognition system which outputs both phonemes and words (or just phonemes) may be used during the subsequent retrieval. In this case, a word to phoneme dictionary is not required in order to convert the output from the speech recognition system into phonemes.

In the above embodiment, the insertion, deletion and decoding probabilities were calculated from statistics of the speech recognition system using a maximum likelihood estimate of the probabilities. As those skilled in the art of statistics will appreciate, other techniques, such as maximum entropy techniques, can be used to estimate these probabilities. Details of a suitable maximum entropy technique can be found at pages 45 to 52 in the book entitled "Maximum Entropy and Bayesian Methods" published by Kluwer Academic publishers and written by John Skilling, the contents of which are incorporated herein by reference.

In the above embodiment, the database 29 and the automatic speech recognition unit 51 were both located within the user terminal 59. As those skilled in the art will appreciate, this is not essential. FIG. 21 illustrates an embodiment in which the database 29 and the search engine 53 are located in a remote server 60 and in which the user terminal 59 accesses the database 29 via the network interface units 67 and 69 and a data network 68 (such as the Internet). In this embodiment, the user terminal 59 can only receive voice queries from the microphone 7. In this embodiment, these queries are converted into phoneme and word data by the automatic speech recognition unit 51. This data is then passed to the control unit 55 which controls the transmission of the data over the data network 68 to the search engine 53 located within the remote server 60. The search engine 53 then carries out the search in a similar manner to the way in which the search was performed in the above embodiment. The results of the search are then transmitted back from the search engine 53 to the control unit 55 via the data network 68. The control unit 55 then considers the search results received back from the network and displays appropriate data on the display 57 for viewing by the user 39. Additionally, part of all of the phoneme and word data generated for the input query may include commands for controlling the manipulation of data files in the database stored in the remote server. This may be used, for example, to control the playing, forwarding and rewinding of a video data file which is played to the user on the client 59 over the data network 68. In this case, since the user terminal 59 performs the speech recognition processing, more efficient use is made of the remote server 60 which may have many user terminals trying to access and control simultaneously data files in the database 29.

In addition to locating the database 29 and the search engine 53 in the remote server 60, it is also possible to locate the automatic speech recognition unit 51 in the remote server 60. Such an embodiment is shown in FIG. 22. As shown, in this embodiment, the input voice query from the user is passed via input line 61 to a speech encoding unit 73 which is operable to encode the speech for efficient transfer through the data network 68. The encoded data is then passed to the control unit 55 which transmits the data over the network 68 to the remote server 60, where it is processed by the automatic speech recognition unit 51. The phoneme and word data generated by the speech recognition unit 51 for the input query is then passed to the search engine 53 for use in searching and controlling data files in the database 29. Appropriate data retrieved by the search engine 53 is then passed, via the network interface 69 and the network 68, back to the user terminal 59. This data received back from the remote server is then passed via the network interface unit 67 to the control unit 55 which generates and displays appropriate data on the display 57 for viewing by the user 39.

In a similar manner, a user terminal 59 may be provided which only allows typed inputs from the user and which has the search engine and the database located in the remote server. In such an embodiment, the phonetic transcription unit 75 may be located in the remote server 60 as well.

In the above embodiments, a dynamic programming algorithm was used to align the sequences of phonemes output by the word to phoneme dictionary. As those skilled in the art will appreciate, any alignment technique could be used. For example, a naive technique could be used which considers all possible alignments. However, dynamic programming is preferred because of its ease of implementation using standard processing hardware. Additionally, whilst in the above embodiment, the dynamic programming algorithm determined the "best" alignment between the input sequences of phonemes, this may not, in some applications, be strictly necessary. For example, the second, third or fourth best alignment may be used instead.

In the above embodiments, the dynamic programming alignment unit was operable to simultaneously align a plurality of input sequences of phonemes in order to identify the best alignment between them. In an alternative embodiment, the dynamic programming alignment unit may be arranged to compare two sequences of input phonemes at a time. In this case, for example, the third input phoneme sequence would be aligned with the sequence of phonemes which best represents the first two sequences of phonemes.

In the embodiment described above, during the dynamic programming algorithm, equation (1) was calculated for each aligned pair of phonemes. In the calculation of equation (1), the first sequence phoneme and the second sequence phoneme were compared with each of the phonemes known to the system. As those skilled in the art will appreciate, for a given first sequence phoneme and second sequence phoneme pair, many of the probabilities given in equation (1) will be equal to or very close to zero. Therefore, in an alternative embodiment the aligned phonemes may only be compared with a subset of all the known phonemes, which subset is determined in advance from the training data. To implement such an embodiment, the input phonemes to be aligned could be used to address a lookup table which would identify the phonemes which need to be compared with them using equation (1) (or its multi-input sequence equivalent).

In the above embodiment, where two or more word alternatives are output by the speech recognition unit, the phoneme to word conversion unit determines the most probable phoneme sequence which could have been misrecognised as the word alternatives. As those skilled in the art will appreciate, in some instances, such a word alternative may include more than one word. For example, where the user inputs the word "recognised", the speech recognition system may output the following two alternative recognition results: "recognised" or "wreck a nice".

A number of embodiments and modifications have been described above. As those skilled in the art will appreciate, there are many other embodiments and modifications which will be apparent to those skilled in the art.

We claim:

1. An apparatus for determining a sequence of sub-word unit labels representative of at least two word alternatives output by a word recognition unit in response to a common input word to be recognised, the apparatus comprising:

a receiver operable to receive a first sequence of sub-word unit labels representative of a first one of said at least two word alternatives output by said word recognition unit and operable to receive a second sequence of sub-word unit labels representative of a second one of said at least two word alternatives output by said word recognition unit;

an aligner operable to align and to compare sub-word unit labels of the first sequence with sub-word unit labels of the second sequence to form a number of aligned pairs of sub-word unit labels to determine a best aligned pair of sub-word unit labels; and a processor operable to process the best aligned pair of sub-word unit labels formed by said aligner, to determine an output sequence of sub-word unit labels which is different from the first and second sequences of sub-word unit labels and which is representative of the at least two word alternatives, wherein said processor is operable to determine said output sequence of sub-word unit labels by determining, for each aligned pair of sub-word unit labels, a sub-word unit label that is confusingly similar to the first and second sub-word unit labels of the aligned pair.

2. An apparatus according to claim 1, wherein said processor comprises:

a first comparator operable to compare, for each aligned pair, the first sequence sub-word unit label in the aligned pair with each of a plurality of sub-word unit labels taken from a set of predetermined sub-word unit labels, to provide a corresponding plurality of comparison scores representative of the similarities between the first sequence sub-word unit label and the respective sub-word unit labels of the set;

a second comparator operable to compare, for each aligned pair, the second sequence sub-word unit label in the aligned pair with each of said plurality of sub-word unit labels from the set, to provide a further corresponding plurality of comparison scores representative of the similarities between said second sequence sub-word unit label and the respective sub-word unit labels of the set;

a combiner operable to combine the comparison scores obtained when comparing the first and second sequence sub-word unit labels in the aligned pair with the same sub-word unit label from the set, to generate a plurality of combined comparison scores;

a third comparator operable to compare, for each aligned pair, the combined comparison scores generated by said combiner for the aligned pair; and a determiner operable to determine, for each aligned pair of sub-word unit labels, a sub-word unit label representative of the sub-word unit labels in the aligned pair in dependence upon a comparison result output by said third comparator for the aligned pair.

3. An apparatus according to claim 2, wherein said first and second comparators are operable to compare the first sequence sub-word unit label and the second sequence sub-word unit label respectively with each of the sub-word unit labels in said set of sub-word unit labels.

4. An apparatus according to claim 2, wherein said first and second comparators are operable to provide comparison scores which are indicative of a probability of confusing the corresponding sub-word unit label taken from the set of predetermined sub-word unit labels as the sub-word unit label in the aligned pair.

5. An apparatus according to claim 4, wherein said combiner is operable to combine the comparison scores in order to multiply the probabilities of confusing the corresponding sub-word unit label taken from the set as the sub-word unit labels in the aligned pair.

6. An apparatus according to claim 5, wherein each of said sub-word unit labels in said set of predetermined sub-word unit labels has a predetermined probability of occurring within a sequence of sub-word unit labels and wherein said combiner is operable to weight each of said combined comparison scores in dependence upon the respective probability of occurrence for the sub-word unit label of the set used to generate the combined comparison score.

7. An apparatus according to claim 6, wherein said combiner is operable to combine said comparison scores by calculating:

$$P(d_i^1|p_r)P(d_j^2|p_r)P(p_r)$$

where $d_i^1$ and $d_j^2$ are an aligned pair of first and second sequence sub-word unit labels respectively, $P(d_i^1|p_r)$ is the comparison score output by said first comparator and is representative of the probability of confusing set sub-word unit label $p_r$ as first sequence sub-word unit label $d_i^1$; $P(d_j^2|p_r)$ is the comparison score output by said second comparator and is representative of the probability of confusing set sub-word unit label $p_r$ as second sequence sub-word unit label $d_j^2$; and $P(p_r)$ is a weight which represents the probability of set sub-word unit label $p_r$ occurring in a sequence of sub-word unit labels.

8. An apparatus according to claim 7, wherein said third comparator is operable to identify the set sub-word unit label $p_r$ which gives the maximum combined comparison score and wherein said determiner is operable to determine said sub-word unit label representative of the sub-word unit labels in the aligned pair as being the sub-word unit label which provides the maximum combined comparison score.

9. An apparatus according to claim 5, wherein said comparison scores represent log probabilities and wherein said combiner is operable to multiply said probabilities by adding the respective comparison scores.

10. An apparatus according to claim 2, wherein each of the sub-word unit labels in said first and second sequences of sub-word unit labels belong to said set of predetermined sub-word unit labels and wherein said first and second comparators are operable to provide said comparison scores using predetermined data which relate the sub-word unit labels in said set to each other.

11. An apparatus according to claim 10, wherein said predetermined data comprises, for each sub-word unit label in the set of sub-word unit labels, a probability for confusing that sub-word unit label with each of the other sub-word unit labels in the set of sub-word unit labels.

12. An apparatus according to claim 1, wherein said aligner comprises a dynamic programmer operable to align said first and second sequences of sub-word unit labels using a dynamic programming technique.

13. An apparatus according to claim 12, wherein said dynamic programmer is operable to determine an optimum alignment between said first and second sequences of sub-word unit labels.

14. An apparatus according to claim 1, wherein each of said sub-word unit labels represents a phoneme.

15. An apparatus according to claim 1, wherein said receiver is operable to receive a third sequence of sub-word unit labels representative of a third word alternative output by said word recognition unit and wherein said aligner is operable to simultaneously align and compare the sub-word unit labels of the first, second and third sequences of sub-word unit labels.

16. An apparatus according to claim 1, wherein said receiver is operable to receive a third sequence of sub-word unit labels representative of a third word alternative output by said word recognition unit and wherein said aligner is operable to align and compare two sequences of sub-word unit labels at a time.

17. An apparatus according to claim 1, further comprising a word to sub-word unit label dictionary which is operable to receive the at least two word alternatives output by said word recognition unit and to generate therefrom said first and second sequences of sub-word unit labels.

18. An apparatus according to claim 1, further comprising an annotator operable to annotate a data file using the output sequence of sub-word unit labels output determined by said processor.

19. An apparatus according to claim 18, wherein said annotator is operable to annotate said data file using said output sequence of sub-word unit labels and said at least two word alternatives output by said word recognition unit.

20. An apparatus according to claim 19, wherein said output sequence of sub-word unit labels and said at least two word alternatives are combined to form annotation data for the data file.

21. An apparatus according to claim 18, wherein said data file is one of: an audio data file, a video data file, an image data file or a text data file.

22. An apparatus according to claim 1, wherein said word recognition unit comprises a speech recognition system.

23. An apparatus according to claim 1, wherein said word recognition unit comprises a handwriting recognition system.

24. An apparatus for determining a sequence of sub-word unit labels representative of at least two words, the apparatus comprising:
  a receiver operable to receive a first sequence of sub-word unit labels representative of a first word and a second sequence of sub-word unit labels representative of a second word output by a word recognition unit in response to a common input word;
  an aligner operable to align sub-word unit labels of the first sequence with sub-word unit labels of the second sequence to form a number of aligned pairs of sub-word unit labels to determine a best aligned pair of sub-word unit labels; and
  a processor operable to process the best aligned pair of sub-word unit labels formed by said aligner to determine an output sequence of sub-word unit labels which is different from the first and second sequences of sub-word unit labels and which is representative of the first and second sequences of sub-word unit labels by determining, for each aligned pair of sub-word unit labels, a sub-word unit label that is confusingly similar to the sub-word unit labels of the aligned pair.

25. An apparatus for determining a sequence of sub-word unit labels representative of at least two word alternatives output by a word recognition unit in response to a common input word to be recognised, the apparatus comprising:
  a receiver operable to receive the at least word alternatives output by the word recognition unit;
  a generator operable to generate, for each received word alternative, a sequence of sub-word unit labels representative of the word alternative;
  an aligner operable to align and compare the sub-word unit labels of each generated sequence of sub-word unit labels to form a number aligned groups of sub-word unit labels to determine a best aligned group of sub-word unit labels; and a processor operable to process the best aligned group of sub-word unit labels formed by said aligner, to determine an output sequence of sub-word unit labels which is different from the first and second sequences of sub-word unit labels and which is representative of the received word alternatives, wherein said processor is operable to determine said output sequence of sub-word unit labels by determining, for each aligned group of sub-word unit labels, a sub-word unit label that is confusingly similar to the first and second sub-word unit labels of the aligned pair.

26. An apparatus for determining a sequence of sub-word unit labels representative of at least two word alternatives output by a word recognition unit in response to a common input word to be recognised, the apparatus comprising:

a receiver operable to receive the at least two word alternatives output by the word recognition unit;

a generator operable to generate, for each received word alternative, a sequence of sub-word unit labels representative of the received word alternative;

an aligner operable to align and compare the sub-word unit labels of each generated sequence of sub-word unit labels to form a number aligned groups of sub-word unit labels to determine a best aligned group of sub-word unit labels; and a processor operable to process the best aligned group of sub-word unit labels formed by said aligner, to determine an output sequence of sub-word unit labels which is different from the first and second sequences of sub-word unit labels and which is representative of the at least two word alternatives by determining, for each aligned group of sub-word unit labels, a sub-word unit label that is confusingly similar to the sub-word unit labels of the group.

27. An apparatus for determining a sequence of sub-word unit labels representative of at least two word alternatives output by a word recognition unit in response to a common input word to be recognised, the apparatus comprising:

a receiver operable to receive a first sequence of sub-word unit labels representative of a first one of said at least two word alternatives output by said word recognition unit and operable to receive a second sequence of sub-word unit labels representative of a second one of said at least two word alternatives output by said word recognition unit;

an aligner operable to align and compare sub-word unit labels of the first sequence with sub-word unit labels of the second sequence to form a number of aligned pairs of sub-word unit labels;

a first comparator operable to compare, for each aligned pair, the first sequence sub-word unit label in the aligned pair with each of a plurality of sub-word unit labels taken from a set of predetermined sub-word unit labels, to provide a corresponding plurality of comparison scores representative of the similarities between the first sequence sub-word unit label and the respective sub-word unit labels of the set;

a second comparator operable to compare, for each aligned pair, the second sequence sub-word unit label in the aligned pair with each of said plurality of sub-word unit labels from the set, to provide a further corresponding plurality of comparison scores representative of the similarities between said second sequence sub-word unit label and the respective sub-word unit labels of the set;

a combiner operable to combine the comparison scores obtained when comparing the first and second sequence sub-word unit labels in the aligned pair with the same sub-word unit label from the set, to generate a plurality of combined comparison scores;

a third comparator operable to compare, for each aligned pair, the combined comparison scores generated by said combiner for the aligned pair; and a determiner operable to determine, for each aligned pair of sub-word unit labels, a sub-word unit label representative of the sub-word unit labels in the aligned pair in dependence upon a comparison result output by said third comparator for the aligned pair.

28. A method of determining a sequence of sub-word unit labels representative of at least two word alternatives output by a word recognition unit in response to a common input word to be recognised, the method comprising:

receiving a first sequence of sub-word unit labels representative of a first one of said at least two word alternatives output by said word recognition unit;

receiving a second sequence of sub-word unit labels representative of a second one of said at least two word alternatives output by said word recognition unit;

aligning and comparing sub-word unit labels of the first sequence with sub-word unit labels of the second sequence to form a number of aligned pairs of sub-word unit labels to determine a best aligned pair of sub-word unit labels; and processing the best aligned pair of sub-word unit labels formed in said aligning step, to determine an output sequence of sub-word unit labels which is different from the first and second sequences of sub-word unit labels and which is representative of the at least two word alternatives, wherein said processing step determines said output sequence of sub-word unit labels by determining, for each aligned pair of sub-word unit labels, a sub-word unit label that is confusingly similar to the first and second sub-word unit labels of the aligned pair.

29. A method according to claim 28, wherein said processing step comprises:

a first comparing step of comparing, for each aligned pair, the first sequence sub-word unit label in the aligned pair with each of a plurality of sub-word unit labels taken from a set of predetermined sub-word unit labels, to provide a corresponding plurality of comparison scores representative of the similarities between the first sequence sub-word unit label and the respective sub-word unit labels of the set;

a second comparing step of comparing, for each aligned pair, the second sequence sub-word unit label in the aligned pair with each of said plurality of sub-word unit labels from the set, to provide a further corresponding plurality of comparison scores representative of the similarities between said second sequence sub-word unit label and the respective sub-word unit labels of the set;

combining the comparison scores obtained when comparing the first and second sequence sub-word unit labels in the aligned pair with the same sub-word unit label from the set, to generate a plurality of combined comparison scores;

a third comparing step of comparing, for each aligned pair, the combined comparison scores generated in said combining step for the aligned pair; and determining, for each aligned pair, a sub-word unit label representative of the sub-word unit labels in the aligned pair in dependence upon a comparison result output from said third comparing step for the aligned pair.

30. A method according to claim 29, wherein said first and second comparing steps compare the first sequence sub-word unit label and the second sequence sub-word unit label respectively with each of the sub-word unit labels in said set of sub-word unit labels.

31. A method according to claim 29, wherein said first and second comparing steps provide comparison scores which are indicative of a probability of confusing the corresponding sub-word unit label taken from the set of predetermined sub-word unit labels as the sub-word unit label in the aligned pair.

32. A method according to claim 31, wherein said combining step combines the comparison scores in order to multiply the probabilities of confusing the corresponding sub-word unit label taken from the set as the sub-word unit labels in the aligned pair.

33. A method according to claim 32, wherein each of said sub-word unit labels in said set of predetermined sub-word unit labels has a predetermined probability of occurring within a sequence of sub-word unit labels and wherein said combining step weights each of said combined comparison scores in dependence upon the respective probability of occurrence for the sub-word unit label of the set used to generate the combined comparison score.

34. A method according to claim 33, wherein said combining step combines said comparison scores by calculating:

$$P(d_i^1|p_r)P(d_j^2|p_r)P(p_r)$$

where $d_i^1$ and $d_j^2$ are an aligned pair of first and second sequence sub-word unit labels respectively; $P(d_i^1|p_r)$ is the comparison score output by said first comparing step and is representative of the probability of confusing set sub-word unit label $p_r$ as first sequence sub-word unit label $d_i^1$; $P(d_j^2|p_r)$ is the comparison score output by said second comparing step and is representative of the probability of confusing set sub-word unit label $p_r$ as second sequence sub-word unit label $d_j^2$; and $P(p_r)$ is a weight which represents the probability of set sub-word unit label $p_r$ occurring in a sequence of sub-word unit labels.

35. A method according to claim 34, wherein said third comparing step identifies the set sub-word unit label $p_r$ which gives the maximum combined comparison score and wherein said determining step determines said sub-word unit label representative of the sub-word unit labels in the aligned pair as being the sub-word unit label which provides the maximum combined comparison score.

36. A method according to claim 32, wherein said comparison scores represent log probabilities and wherein said combining step multiplies said probabilities by adding the respective comparison scores.

37. A method according to claim 29, wherein each of the sub-word unit labels in said first and second sequences of sub-word units belong to said set of predetermined sub-word unit labels and wherein said first and second comparing steps provide said comparison scores using predetermined data which relate the sub-word unit labels in said set to each other.

38. A method according to claim 37, wherein said predetermined data comprises, for each sub-word unit label in the set of sub-word unit labels, a probability for confusing that sub-word unit label with each of the other sub-word unit labels in the set of sub-word unit labels.

39. A method according to claim 28, wherein said aligning and comparing step uses a dynamic programming technique to align said first and second sequences of sub-word unit labels.

40. A method according to claim 39, wherein said dynamic programming technique determines an optimum alignment between said first and second sequences of sub-word unit labels.

41. A method according to claim 28, wherein each of said sub-word unit labels represents a phoneme.

42. A method according to claim 28, further comprising receiving a third sequence of sub-word unit labels representative of a third word alternative output by said word recognition unit and wherein said aligning and comparing step simultaneously aligns and compares the sub-word unit labels of the first, second and third sequences of sub-word unit labels.

43. A method according to claim 28, further comprising receiving a third sequence of sub-word unit labels representative of a third word alternative output by said recognition unit and wherein said aligning and comparing step aligns and compares two sequences of sub-word unit labels at a time.

44. A method according to claim 28, further comprising the step of using a word to sub-word unit label dictionary to convert the words output by said word recognition unit into said sequences of sub-word unit labels.

45. A method according to claim 28, further comprising the step of annotating a data file using the sub-word unit labels determined by said processing step.

46. A method according to claim 45, wherein said annotating step annotates said data file using said output sequence of sub-word unit labels and said word alternatives output by said word recognition unit.

47. A method according to claim 46, wherein said output sequence of sub-word unit labels and said word alternatives are combined to form annotation data for the data file.

48. A method according to claim 45, wherein said data file is one of: an audio data file, a video data file, an image data file, or a text data file.

49. A method according to claim 28, wherein said word recognition unit comprises a speech recognition system.

50. A method apparatus according to claim 28, wherein said word recognition unit comprises a handwriting recognition system.

51. A method of determining a sequence of sub-word unit labels representative of at least two words output by a word recognition unit in response to a common input word to be recognised, the method comprising:

receiving a first sequence of sub-word unit labels representative of a first word of said at least two words;

receiving a second sequence of sub-word unit labels representative of a second word of said at least two word;

aligning sub-word unit labels of the first sequence with sub-word unit labels of the second sequence to form a number of aligned pairs of sub-word unit labels to determine a best aligned pair of sub-word unit labels; and processing the best aligned pair of sub-word unit labels formed in said aligning step, to determine an output sequence of sub-word unit labels which is different from the first and second sequences of sub-word unit labels and which is representative of the first and second sequences of sub-word unit labels by determining, for each aligned pair of sub-word unit labels, a sub-word unit label that is confusingly similar to the sub-word unit labels of the aligned pair.

52. A method of determining a sequence of sub-word unit labels representative of at least two word alternatives output by a word recognition unit in response to a common input word to be recognised, the method comprising:

receiving the at least two word alternatives output by the word recognition unit;

generating, for each received word alternative, a sequence of sub-word unit labels representative of the word alternative;

aligning and comparing the sub-word unit labels of each generated sequence of sub-word unit labels to form a number of aligned groups of sub-word unit labels to determine a best aligned group of sub-word unit labels; and processing the best aligned group of sub-word unit labels formed in said aligning and comparing step to determine an output sequence of sub-word unit labels which is different from the first and second sequences of sub-word unit labels and which is representative of the received word alternatives, wherein said processing step determines said output sequence of sub-word unit labels by determining, for each aligned group of sub-word unit labels, a sub-word unit label that is confusingly similar to the first and second sub-word unit labels of the aligned pair.

53. A method of determining a sequence of sub-word unit labels representative of at least two word alternatives output by a word recognition unit in response to a common input word to be recognised, the method comprising:

receiving the at least two word alternatives output by the word recognition unit;

generating, for each received word alternative, a sequence of sub-word unit labels representative of the word alternative;

aligning and comparing the sub-word unit labels of each generated sequence of sub-word unit labels to form a number of aligned groups of sub-word unit labels to determine a best aligned group of sub-word unit labels; and processing the best aligned group of sub-word labels formed in said aligning and comparing step to determine an output sequence of sub-word unit labels which is different from the first and second sequences of sub-word unit labels and which is representative of the at least two word alternatives by determining, for each aligned group, a sub-word unit label that is confusingly similar to the sub-word unit labels of the group.

54. A method of determining a sequence of sub-word unit labels representative of at least two word alternatives output by a word recognition unit in response to a common input word to be recognised, the method comprising:

receiving a first sequence of sub-word unit labels representative of a first one of said at least two word alternatives output by said word recognition unit;

receiving a second sequence of sub-word unit labels representative of a second one of said at least two word alternative output by said word recognition unit;

aligning and comparing sub-word unit labels of the first sequence with sub-word unit labels of the second sequence to form a number of aligned pairs of sub-word unit labels;

a first comparing step of comparing, for each aligned pair, the first sequence sub-word unit label in the aligned pair with each of a plurality of sub-word unit labels taken from a set of predetermined sub-word unit labels, to provide a corresponding plurality of comparison scores representative of the similarities between the first sequence sub-word unit label and the respective sub-word unit labels of the set;

a second comparing step of comparing, for each aligned pair, the second sequence sub-word unit label in the aligned pair with each of said plurality of sub-word unit labels from the set, to provide a further corresponding plurality of comparison scores representative of the similarities between said second sequence sub-word unit label and the respective sub-word unit labels of the set;

combining the comparison scores obtained when comparing the first and second sequence sub-word unit labels in the aligned pair with the same sub-word unit label from the set, to generate a plurality of combined comparison scores;

a third comparing step of comparing, for each aligned pair, the combined comparison scores generated in said combining step for the aligned pair; and determining, for each aligned pair, a sub-word unit representative of the sub-word unit labels in the aligned pair in dependence upon a comparison result output from said third comparing step for the aligned pair.

55. A computer readable medium storing computer executable process steps to perform a method of determining a sequence of sub-word unit labels representative of at least two word alternatives output by a word recognition unit in response to a common input word to be recognised, the process steps comprising:

steps for receiving a first sequence of sub-word unit labels representative of a first one of said at least two word alternatives output by said word recognition unit;

steps for receiving a second sequence of sub-word unit labels representative of a second one of said at least two word alternatives output by the word recognition unit;

steps for aligning and comparing sub-word unit labels of the first sequence with sub-word unit labels of the second sequence to form a number of aligned pairs of sub-word unit labels to determine a best aligned pair of sub-word unit labels; and steps for processing the best aligned pair of sub-word unit labels formed in said aligning and comparing step to determine an output sequence of sub-word unit labels which is different from the first and second sequences of sub-word unit labels and which is representative of the at least two word alternatives, wherein said steps for processing determines said output sequence of sub-word unit labels by determining, for each aligned pair of sub-word unit labels, a sub-word unit label that is confusingly similar to the first and second sub-word unit labels of the aligned pair.

56. A computer executable program stored on a computer readable medium, the computer executable program for controlling a processor to perform a method of determining a sequence of sub-word unit labels representative of at least two word alternatives output by a word recognition unit in response to a common input word to be recognised, the program comprising:

code for receiving a first sequence of sub-word unit labels representative of a first one of said at least two word alternatives output by the word recognition unit;

code for receiving a second sequence of sub-word unit labels representative of a second one of said at least two word alternative output by the word recognition unit;

code for aligning and comparing sub-word unit labels of the first sequence with sub-word unit labels of the second sequence to form a number of aligned pairs of sub-word unit labels to determine a best aligned pair of sub-word unit labels, and code for processing the best aligned pair of sub-word unit labels formed by said aligning and comparing code to determine an output sequence of sub-word unit labels which is different from the first and second sequences of sub-word unit labels and which is representative of the at least two word alternatives, wherein said code for processing determines said output sequence of sub-word unit labels by determining, for each aligned pair of sub-word unit labels, a sub-word unit label that is confusingly similar to the first and second sub-word unit labels of the aligned pair.

57. An apparatus for determining a sequence of sub-word unit labels representative of at least two word alternatives output by a word recognition unit in response to a common input word to be recognised, the apparatus comprising:

means for receiving a first sequence of sub-word unit labels representative of a first one of said at least two word alternatives output by said word recognition unit and for receiving a second sequence of sub-word unit labels representative of a second one of said at least two word alternatives output by said word recognition unit;

means for aligning and for comparing sub-word unit labels of the first sequence with sub-word labels of the second sequence to form a number of aligned pairs of sub-word unit labels to determine a best aligned pair of sub-word unit labels; and means for processing the best aligned pair of sub-word unit labels formed by said aligning means to determine an output sequence of sub-word unit labels which is different from the first and second sequences of sub-word unit labels and which is representative of the least two word alternatives, wherein said means for processing determines said output sequence of sub-word unit labels by determining, for each aligned pair of sub-word unit labels, a sub-word unit label that is confusingly similar to the first and second sub-word unit labels of the aligned pair.

58. An apparatus for determining a sequence of sub-word unit labels representative of at least two words output by a word recognition unit in response to a common input word to be recognised, the apparatus comprising:

means for receiving a first sequence of sub-word unit labels representative of a first word and for receiving a second sequence of sub-word unit labels representative of a second word;

means for aligning sub-word unit labels of the first sequence with sub-word unit labels of the second sequence to form a number aligned pairs of sub-word unit labels to determine a best aligned pair of sub-word unit labels; and means for processing the best aligned pair of sub-word unit labels formed by said aligning means to determine an output sequence of sub-word unit labels which is different from the first and second sequences of sub-word unit labels and which is representative of the first and second sequence of sub-word unit labels by determining, for each aligned pair of sub-word unit labels, a sub-word unit label that is confusingly similar to the sub-word unit labels of the aligned pair.

59. An apparatus for determining a sequence of sub-word unit labels representative of at least two word alternatives output by a word recognition unit in response to a common input word to be recognised, the apparatus comprising:

means for receiving the at least two word alternatives output by the word recognition unit;

means for generating for each received word alternative, a sequence of sub-word unit labels representative of the word alternative;

means for aligning and comparing the sub-word unit labels of each generated sequence of sub-word unit labels to form a number aligned groups of sub-word unit labels to determine a best aligned group of sub-word unit labels; and means for processing the best aligned group of sub-word unit labels formed by said aligning means, to determine an output sequence of sub-word unit labels which is different from the first and second sequences of sub-word unit labels and which is representative of the received word alternatives, wherein said means for processing determines said output sequence of sub-word unit labels by determining, for each aligned group of sub-word unit labels, a sub-word unit label that is confusingly similar to the first and second sub-word unit labels of the aligned pair.

60. An apparatus for determining a sequence of sub-word unit labels representative of at least two word alternatives output by a word recognition unit in response to a common input word to be recognised, the apparatus comprising:

means for receiving the at least two word alternatives output by the word recognition unit;

means for generating, for each received word alternative, a sequence of sub-word unit labels representative of the received word alternative;

means for aligning and comparing the sub-word unit labels of each generated sequence of sub-word unit labels to form a number aligned groups of sub-word unit labels to determine a best aligned group of sub-word unit labels; and means for processing the best aligned group of sub-word unit labels formed by said aligning means to determine an output sequence of sub-word unit labels which is different from the first and second sequences of sub-word unit labels and which is representative of the at least two word alternatives by determining, for each aligned group of sub-word unit labels, a sub-word unit label that is confusingly similar to the sub-word unit labels of the group.

61. An apparatus for determining a sequence of sub-word unit labels representative of at least two word alternatives output by a word recognition unit in response to a common input word to be recognised, the apparatus comprising:

means for receiving a first sequence of sub-word unit labels representative of a first one of said at least two word alternatives output by said word recognition unit and for receiving a second sequence of sub-word unit labels representative of a second one of said at least two word alternatives output by said word recognition unit;

means for aligning and for comparing sub-word unit labels of the first sequence with sub-word unit labels of the second sequence to form a number of aligned pairs of sub-word unit labels;

first comparing means for comparing, for each aligned pair, the first sequence sub-word unit label in the aligned pair with each of a plurality of sub-word unit labels taken from a set of predetermined sub-word unit labels, to provide a corresponding plurality of comparison scores representative of the similarities between the first sequence sub-word unit label and the respective sub-word unit labels of the set;

second comparing means for comparing, for each aligned pair, the second sequence sub-word unit label in the aligned pair with each of said plurality of sub-word unit labels from the set, to provide a further corresponding plurality of comparison scores representative of the similarities between said second sequence sub-word unit label and their respective sub-word unit labels of the set;

means for combining the comparison scores obtained when comparing the first and second sequence sub-word unit labels in the aligned pair with the same sub-word unit labels from the set, to generate a plurality of combined comparison scores;

third comparing means for comparing, for each aligned pair, the combined comparison scores generated by said combining means for the aligned pair; and means for determining, for each aligned pair of sub-word unit labels, a sub-word unit label representative of the sub-word unit labels in the aligned pair in dependence upon a comparison result output by said third comparing means for the aligned pair.

* * * * *

UNITED STATES PATENT AND TRADEMARK OFFICE
CERTIFICATE OF CORRECTION

| | | |
|---|---|---|
| PATENT NO. | : 7,054,812 B2 | |
| APPLICATION NO. | : 09/840886 | |
| DATED | : May 30, 2006 | |
| INVENTOR(S) | : Jason Peter Andrew Charlesworth et al. | |

It is certified that error appears in the above-identified patent and that said Letters Patent is hereby corrected as shown below:

TITLE PAGE:
Item (56) References Cited, OTHER PUBLICATIONS, after "Micca, G. et al.", "Lttice" should read -- Lattice --.

COLUMN 14:
Line 29, "Backtracking" should read --¶ Backtracking --.

COLUMN 23:
Line 43, "belong" should read -- belongs --.

COLUMN 24:
Line 61, "least word" should read -- least two word --.

COLUMN 27:
Line 61, "belong" should read -- belongs --.

COLUMN 28:
Line 57, "word;" should read -- words; --.

COLUMN 29:
Line 61, "alternative" should read -- alternatives --.

COLUMN 30:
Line 50, "determines" should read -- determine --; and
Line 67, "alternative" should read -- alternatives --.

COLUMN 31:
Line 54, "number" should read -- number of --.

UNITED STATES PATENT AND TRADEMARK OFFICE
CERTIFICATE OF CORRECTION

PATENT NO. : 7,054,812 B2
APPLICATION NO. : 09/840886
DATED : May 30, 2006
INVENTOR(S) : Jason Peter Andrew Charlesworth et al.

It is certified that error appears in the above-identified patent and that said Letters Patent is hereby corrected as shown below:

COLUMN 32:
Lines 10 and 35, "number" should read -- number of --.

Signed and Sealed this

Second Day of October, 2007

JON W. DUDAS
*Director of the United States Patent and Trademark Office*